United States Patent
Brissenden et al.

(10) Patent No.: US 7,294,086 B2
(45) Date of Patent: Nov. 13, 2007

(54) HYDRAULIC CONTROL SYSTEM FOR MULTIPLE CLUTCHES IN A MOTOR VEHICLE

(75) Inventors: James S. Brissenden, Baldwinsville, NY (US); Timothy M. Burns, Elbridge, NY (US); Sankar K. Mohan, Jamesville, NY (US); Eric A. Bansbach, Fayetteville, NY (US); Dumitru Puiu, Sterling Heights, MI (US); Malcolm E. Kirkwood, Livonia, MI (US)

(73) Assignee: Magna Powertrain, USA, Inc., Troy, MI (US)

( * ) Notice: Subject to any disclaimer, the term of this patent is extended or adjusted under 35 U.S.C. 154(b) by 286 days.

(21) Appl. No.: 11/244,158

(22) Filed: Oct. 5, 2005

(65) Prior Publication Data

US 2006/0058146 A1 Mar. 16, 2006

Related U.S. Application Data

(63) Continuation-in-part of application No. 10/730,461, filed on Dec. 8, 2003, now Pat. No. 6,997,299.

(60) Provisional application No. 60/490,895, filed on Jul. 28, 2003.

(51) Int. Cl.
*F16H 48/22* (2006.01)
(52) U.S. Cl. .................. 475/231; 475/249
(58) Field of Classification Search .......... 475/205, 475/221, 223, 230, 231, 249
See application file for complete search history.

(56) References Cited

U.S. PATENT DOCUMENTS

| | | | |
|---|---|---|---|
| 2,837,192 A | | 6/1958 | Dunkelow |
| 3,095,760 A | * | 7/1963 | Schaefer et al. .............. 475/20 |
| 3,253,688 A | * | 5/1966 | Livezey ................... 192/87.13 |
| 4,407,547 A | * | 10/1983 | Edwards .................... 303/9.61 |
| 4,862,769 A | | 9/1989 | Koga et al. |
| 4,895,236 A | | 1/1990 | Sakakibara et al. |
| 4,984,663 A | | 1/1991 | Kato |
| 5,224,906 A | | 7/1993 | Sturm |
| 5,323,871 A | | 6/1994 | Wilson et al. |
| 5,407,024 A | | 4/1995 | Watson et al. |
| 5,794,739 A | | 8/1998 | Ring et al. |
| 6,354,977 B1 | | 3/2002 | Brown et al. |
| 6,446,774 B2 | | 9/2002 | Porter |
| 6,595,086 B2 | | 7/2003 | Kobayashi |
| 6,595,338 B2 | | 7/2003 | Bansbach et al. |
| 6,612,957 B2 | | 9/2003 | Bansbach et al. |

(Continued)

FOREIGN PATENT DOCUMENTS

JP 2018117 1/1990

(Continued)

*Primary Examiner*—Ha D. Ho
(74) *Attorney, Agent, or Firm*—Harness, Dickey & Pierce, P.L.C.

(57) ABSTRACT

A torque transfer mechanism for controlling the magnitude of a clutch engagement force exerted on a clutch pack that is operably disposed between a first rotary member and a second rotary member includes a hydraulic clutch actuation system. The hydraulic clutch actuation system includes a primary fluid circuit coupled to a secondary fluid circuit by a pressure intensifier. The pressure intensifier provides magnified pressure to a piston for actuating the clutch pack.

19 Claims, 23 Drawing Sheets

U.S. PATENT DOCUMENTS

| | | |
|---|---|---|
| 6,626,787 B2 | 9/2003 | Porter |
| 6,681,912 B2 | 1/2004 | Suzuki et al. |
| 6,755,764 B2 * | 6/2004 | Okazaki ..................... 475/235 |
| 7,004,876 B2 * | 2/2006 | Puiu ........................... 475/205 |
| 7,175,558 B2 * | 2/2007 | Puiu et al. .................. 475/225 |
| 2002/0162722 A1 | 11/2002 | Suzuki et al. |

FOREIGN PATENT DOCUMENTS

| | | |
|---|---|---|
| JP | 3066927 | 3/1991 |

* cited by examiner

HYDRAULIC CONTROL SYSTEM FOR MULTIPLE CLUTCHES IN A MOTOR VEHICLE

CROSS-REFERENCE TO RELATED APPLICATIONS

This application is a continuation-in-part of U.S. Ser. No. 10/730,461 filed Dec. 8, 2003, now U.S. Pat. No. 6,997,299, which claims benefit to provisional U.S. Ser. No. 60/490,895 filed Jul. 28, 2003.

FIELD OF THE INVENTION

The present invention relates generally to power transfer systems for controlling the distribution of drive torque between the front and rear drivelines of a four-wheel drive vehicle and/or the left and right wheels of an axle assembly. More particularly, the present invention is directed to a hydraulic clutch actuation system adapted for use in motor vehicle driveline applications having two or more torque transfer mechanisms each equipped with a hydraulically-operated clutch actuator for controlling engagement of a friction clutch.

BACKGROUND OF THE INVENTION

In view of increased demand for four-wheel drive vehicles, many power transfer systems are currently being incorporated into vehicular driveline applications for transferring drive torque to the wheels. In some vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode.

A modern trend in four-wheel drive motor vehicles is to equip the power transmission device with a torque transfer mechanism having a transfer clutch and a power-operated clutch actuator. Typically, the transfer clutch includes a multi-plate clutch assembly that is installed between rotary components of the primary and secondary drivelines and which is actuated by the power-operated clutch actuator in response to control signals sent from a controller. The control signals are typically based on current operating characteristics of the vehicle (i.e., vehicle speed, interaxle speed difference, acceleration, steering angle, etc.) as detected by various sensors. Thus, such torque transfer mechanisms can utilize adaptive control schemes for automatically controlling adaptive torque distribution during all types of driving and road conditions.

Currently, many transfer cases are equipped with a torque transfer mechanism having a power-operated clutch actuator that can automatically regulate the amount of drive torque transferred across the transfer clutch to the secondary output shaft as a function of the electric control signal applied thereto. In some applications, the torque transfer mechanism employs an electromagnetic clutch as the power-operated actuator. For example, U.S. Pat. No. 5,407,024 discloses a electromagnetic coil that is incrementally activated to control movement of a ball-ramp operator for applying a clutch engagement force on a multi-plate clutch assembly. Likewise, Japanese Laid-open Patent Application No. 62-18117 discloses a torque transfer mechanism equipped with an electromagnetic clutch actuator for directly controlling actuation of the multi-plate clutch pack assembly.

As an alternative, U.S. Pat. No. 5,323,871 discloses an on-demand transfer case having a torque transfer mechanism equipped with an electric motor that controls rotation of a cam plate which, in turn, controls pivotal movement of a lever arm that is operable for applying the clutch engagement force to the multi-plate clutch assembly. Moreover, Japanese Laid-open Patent Application No. 63-66927 discloses a torque transfer mechanism which uses an electric motor to rotate one cam plate of a ball-ramp operator for engaging a multi-plate clutch assembly. Finally, U.S. Pat. No. 4,895,236 discloses a transfer case equipped with a torque transfer mechanism having an electric motor driving a reduction gearset for controlling movement of a ball screw operator which, in turn, applies the clutch engagement force to the multi-plate transfer clutch.

To further enhance the tractive and stability control characteristics of four-wheel drive vehicles, it is known to equip such vehicles with brake-based electronic stability control systems and/or traction distributing drive axle assemblies. Typically, such drive axle assemblies include a drive mechanism that is operable for adaptively regulating the side-to-side (i.e., left-right) torque and speed characteristics between a pair of driven wheels. In some instances, a pair of modulatable transfer clutches are used to provide this side-to-side control as is disclosed, for example, in U.S. Pat. Nos. 6,378,677 and 5,699,888. As an alternative, a hydraulically-operated traction distribution axle assembly is shown in U.S. Pat. No. 6,520,880. Additional traction distributing axle assemblies are disclosed in U.S. Pat. Nos. 5,370,588 and 6,213,241.

While many power-operated clutch control systems similar to those described above are currently used in four-wheel drive vehicles, a need exists to advance this technology and address recognized system limitations. For example, the size, weight and electrical power requirements of the electromagnetic coil or the electric motors needed to provide the described clutch engagement loads may make such system cost prohibitive in some motor vehicle applications.

SUMMARY OF THE INVENTION

Thus, it is an object of the present invention to provide a hydraulic clutch actuation system having a low pressure hydraulic circuit coupled to a high pressure hydraulic circuit through a pressure intensifier. The high pressure circuit supplies a hydraulically-operated clutch actuator that is operable for controlling engagement of a transfer clutch.

As a related object, the hydraulically-operated clutch actuator and transfer clutch define a torque transfer mechanism that is well-suited for use in motor vehicle driveline applications to control the transfer of drive torque between a first rotary member and a second rotary member.

According to the present invention, the torque transfer mechanism is adapted for use in a power transmission device for adaptively controlling the drive torque transferred between a primary driveline and a secondary driveline. According to one preferred application, the power transmission device of the present invention is a transfer case with the torque transfer mechanism operable for providing on-demand torque transfer from the primary driveline to the secondary driveline. In a related application, the torque transfer mechanism is operable for varying the torque distribution and limiting interaxle slip between the primary and secondary drivelines. According to another preferred application, the power transmission device is a torque distributing assembly with the torque transfer mechanism operable to control speed differentiation and torque distribution across a differential.

In addition, the present invention is directed to a drive axle assembly having a torque distributing drive mechanism and an active yaw control system. The torque distributing drive mechanism includes a differential and first and second torque transfer mechanisms. The differential functions to transfer drive torque from the vehicle's powertrain to first and second axleshafts while permitting speed differentiation therebetween. The first torque transfer mechanism is operable for selectively increasing or decreasing the rotary speed of the first axleshaft while the second torque transfer mechanism is similarly arranged for selectively increasing or decreasing the rotary speed of the second axleshaft. Accordingly, selective control over actuation of one or both of the torque transfer mechanisms provides adaptive control of the speed differentiation and drive torque transferred between the first and second axleshafts. The active yaw control system includes sensors for detecting a vehicle yaw condition. The first and second torque transfer mechanisms are adaptively controlled by the hydraulic clutch actuation system.

In accordance with another preferred embodiment of a drive axle assembly, the torque distributing drive mechanism includes a differential, at least one speed changing unit, and first and second torque transfer mechanisms that are operable to selectively vary the rotary speed of one axleshaft so as to cause corresponding variation in the rotary speed of the other axleshaft. Each torque transfer mechanism includes a multi-plate friction cutch and a clutch actuator controlled by the hydraulic clutch actuation system.

In accordance with another embodiment, the drive axle assembly of the present invention includes first and second axleshafts and a torque distributing drive mechanism that is operable to selectively couple a driven input shaft to one or both of the axleshafts. The drive mechanism includes a differential, a planetary gear assembly, and first and second torque transfer mechanisms. The planetary gear assembly is operably disposed between the differential and the first axleshaft. The first torque transfer mechanism is operable in association with the planetary gear assembly to increase the rotary speed of the first axleshaft which, in turn, causes the differential to decrease the rotary speed of the second axleshaft. In contrast, the second torque transfer mechanism is operable in association with the planetary gear assembly to decrease the rotary speed of the first axleshaft so as to cause the differential to increase the rotary speed of the second axleshaft. Accordingly, selective control over actuation of one or both of the first and second torque transfer mechanisms provides adaptive control of the speed differentiation and the torque transferred between the first and second axleshafts.

According to yet another embodiment, the drive axle assembly of the present invention includes first and second axleshafts and a torque distributing drive mechanism that is operable for transferring drive torque from a driven input shaft to the first and second axleshafts. The torque distributing drive mechanism includes a differential, first and second speed changing units, and first and second torque transfer mechanisms. The differential includes an input component driven by the input shaft, a first output component driving the first axleshaft and a second output component driving the second axleshaft. The first speed changing unit includes a first planetary gearset having a first sun gear driven by the first output component, a first ring gear and a set of first planet gears rotatably supported by the input component and which are meshed with the first ring gear and the first sun gear. The second speed changing unit includes a second planetary gearset having a second sun gear driven by the second output component, a second ring gear and a set of second planet gears rotatably supported by the input component and which are meshed with the second ring gear and the second sun gear. The first torque transfer mechanism is operable for selectively braking rotation of the first ring gear. Likewise, the second torque transfer mechanism is operable for selectively braking rotation of the second ring gear. Accordingly, selective control over actuation of the first and second torque transfer mechanisms provides adaptive control of the speed differentiation and the torque transferred between the first and second axleshafts.

In accordance with another embodiment of a drive axle assembly according to the present invention, the torque distributing drive mechanism includes a differential, first and second speed changing units, and first and second torque transfer mechanisms. The differential includes an input component driven by the input shaft and first and second output components. The first speed changing unit is a first planetary gearset having a first sun gear driving the first axleshaft, a first ring gear driven by the first output component and a set of first planet gears rotatably supported by the input component and which are meshed with the first sun gear and the first ring gear. The second speed changing unit is a second planetary gearset having a second sun gear driving the second axleshaft, a second ring gear driven by the second output component and a set of second planet gears rotatably supported by the input component and which are meshed with the second sun gear and the second ring gear. The first torque transfer mechanism is again operable for selectively braking rotation of the first ring gear while the second torque transfer mechanism is operable for selectively braking rotation of the second ring gear. The hydraulic clutch actuation system controls actuation of the first and second torque transfer mechanisms for controlling the speed differentiation and torque transferred between the first and second axleshafts.

In accordance with a further embodiment, a drive axle assembly according to the present invention includes first and second axleshafts and a torque distributing drive mechanism that is operable for transferring drive torque from a driven input shaft to the first and second axleshafts. The torque distributing drive mechanism includes a differential, first and second speed changing units, and first and second torque transfer mechanisms. The differential includes an input component driven by the input shaft, a first output component driving the first axleshaft and a second output component driving the second axleshaft. The first speed changing unit includes a first planetary gearset having a first planet carrier driven with the first output component, a first ring gear driven by the input component, a first sun gear and a set of first planet gears rotatably supported by the first planet carrier and which are meshed with the first ring gear and the first sun gear. The second speed changing unit includes a second planetary gearset having a second planet carrier driven with the second output component, a second ring gear driven by the input component, a second sun gear and a set of second planet gears rotatably supported by the second planet carrier and which are meshed with the second ring gear and the second sun gear. The first torque transfer mechanism is operable for selectively braking rotation of the first sun gear. Likewise, the second torque transfer mechanism is operable for selectively braking rotation of the second sun gear. Accordingly, selective control over actuation of the first and second torque transfer mechanisms provides adaptive control of the speed differentiation and the torque transferred between the first and second axleshafts.

According to another embodiment, the drive axle assembly of the present invention includes first and second axleshafts and a torque distributing drive mechanism that is operable for transferring drive torque from a driven input shaft to the first and second axleshafts. The torque distributing drive mechanism includes a differential, a speed changing unit, and first and second torque transfer mechanisms. The differential includes an input component driven by the input shaft, a first output component driving the first axleshaft and a second output component driving the second axleshaft. The speed changing unit includes a first shaft commonly driven with the first axleshaft, a second shaft commonly driven with the second axleshaft, and first and second gearsets driven by the first shaft. The first torque transfer mechanism is operable for selectively coupling the first gearset to the second shaft. Likewise, the second torque transfer mechanism is operable for selectively coupling the second gearset to the second shaft. Accordingly, selective control over actuation of one or both of the first and second torque transfer mechanisms provides adaptive control of the speed differentiation and the torque transferred between the first and second axleshafts.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a hydraulic clutch actuation system that is well-suited for use with a torque transfer mechanism for adaptively controlling the torque transferred from a first rotary member to a second rotary member. The torque transfer mechanism finds particular application in motor vehicle drivelines as, for example, an on-demand clutch in a transfer case or in-line torque coupling, a biasing clutch associated with a differential assembly in a transfer case or a drive axle assembly, as a shift clutch in automatic transmissions or in torque vectoring drive axles. Thus, while the present invention is hereinafter described in association with particular driveline applications, it will be understood that the arrangements shown and described are merely intended to illustrate exemplary embodiments of the present invention.

Figure 1:
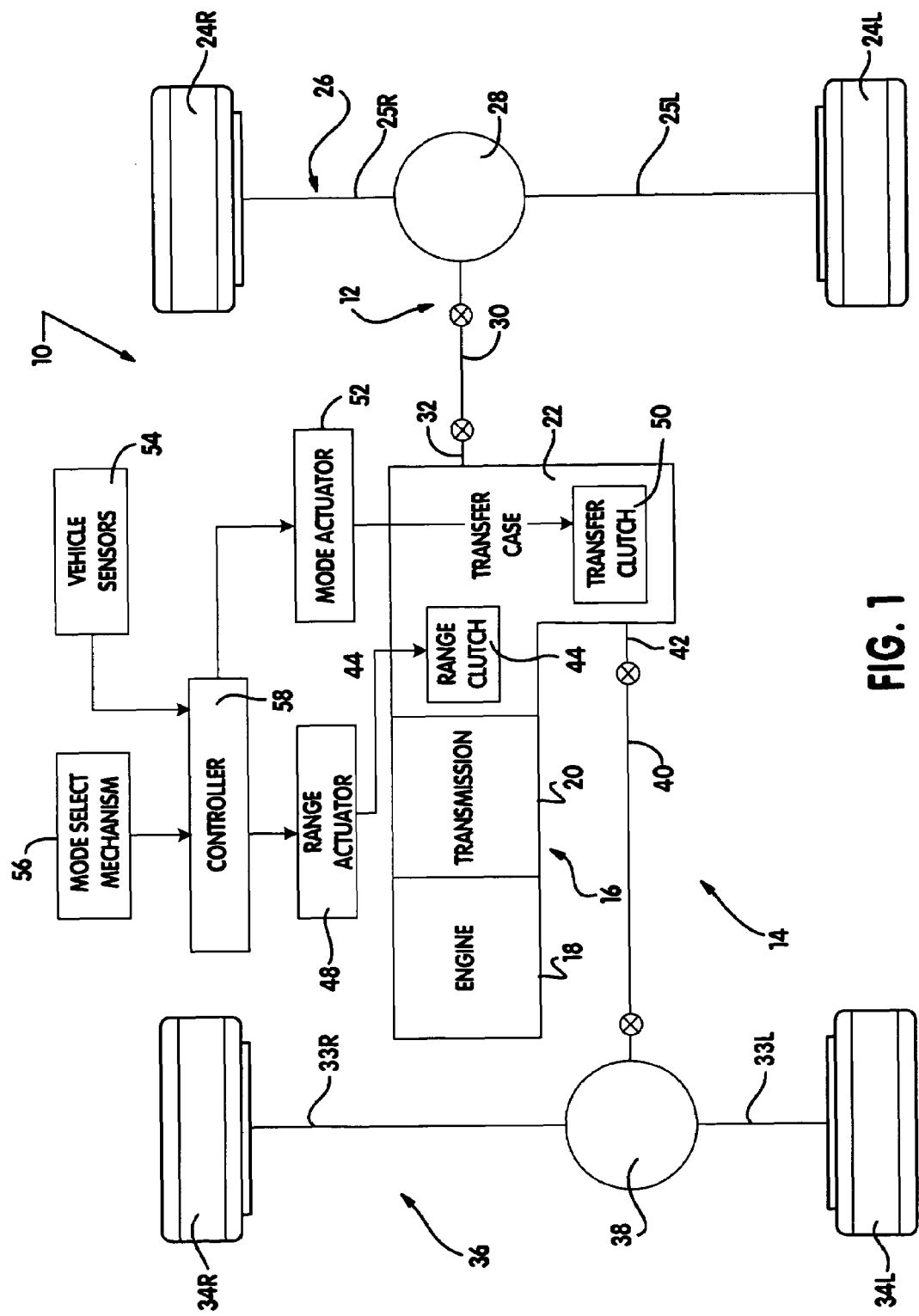
FIG. 1 illustrates the drivetrain of a four-wheel drive vehicle equipped with a transfer case incorporating the present invention.

With particular reference to FIG. 1 of the drawings, a drivetrain 10 for a four-wheel drive vehicle is shown. Drivetrain 10 includes a primary driveline 12, a secondary driveline 14 and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20 and a power transmission device, hereinafter referred to as transfer case 22. Rear driveline 12 includes a pair of rear wheels 24L and 24R connected at opposite ends of axleshafts 25L and 25R associated with a rear axle assembly 26 which also includes a rear differential 28. A rear drive shaft 30 interconnects rear differential 28 to a rear output shaft 32 of transfer case 22. Likewise, front driveline 14 includes a pair of front wheels 34 connected at opposite ends of axleshafts 33L and 33R associated with a front axle assembly 36 which also includes a front differential unit 38. A front drive shaft 40 interconnects front differential 38 to a front output shaft 42 of transfer case 22.

With continued reference to FIG. 1, drivetrain 10 is shown to further include a power transfer system for permitting a vehicle operator to select between a two-wheel drive mode, a part-time four-wheel high-range drive mode, an on-demand four-wheel high-range drive mode, a neutral non-driven mode, and a part-time four-wheel low-range drive mode. In this regard, transfer case 22 is equipped with a range clutch 44 that is operable for establishing the high-range and low-range drive connections between an input shaft 46 and rear output shaft 32, and a range actuator 48 that is operable for actuating range clutch 44. Transfer case 22 also includes a transfer clutch 50 that is operable for transferring drive torque from rear output shaft 32 to front output shaft 42 for establishing the part-time and on-demand four-wheel drive modes. The power transfer system further includes a hydraulically-operated clutch actuator 52 for actuating transfer clutch 50, vehicle sensors 54 for detecting certain dynamic and operational characteristics of the motor vehicle, a mode select mechanism 56 for permitting the vehicle operator to select one of the available drive modes and a controller 58 for controlling actuation of range actuator 48 and clutch actuator 52 in response to input signals from vehicle sensors 54 and mode select mechanism 56.

Figure 2:
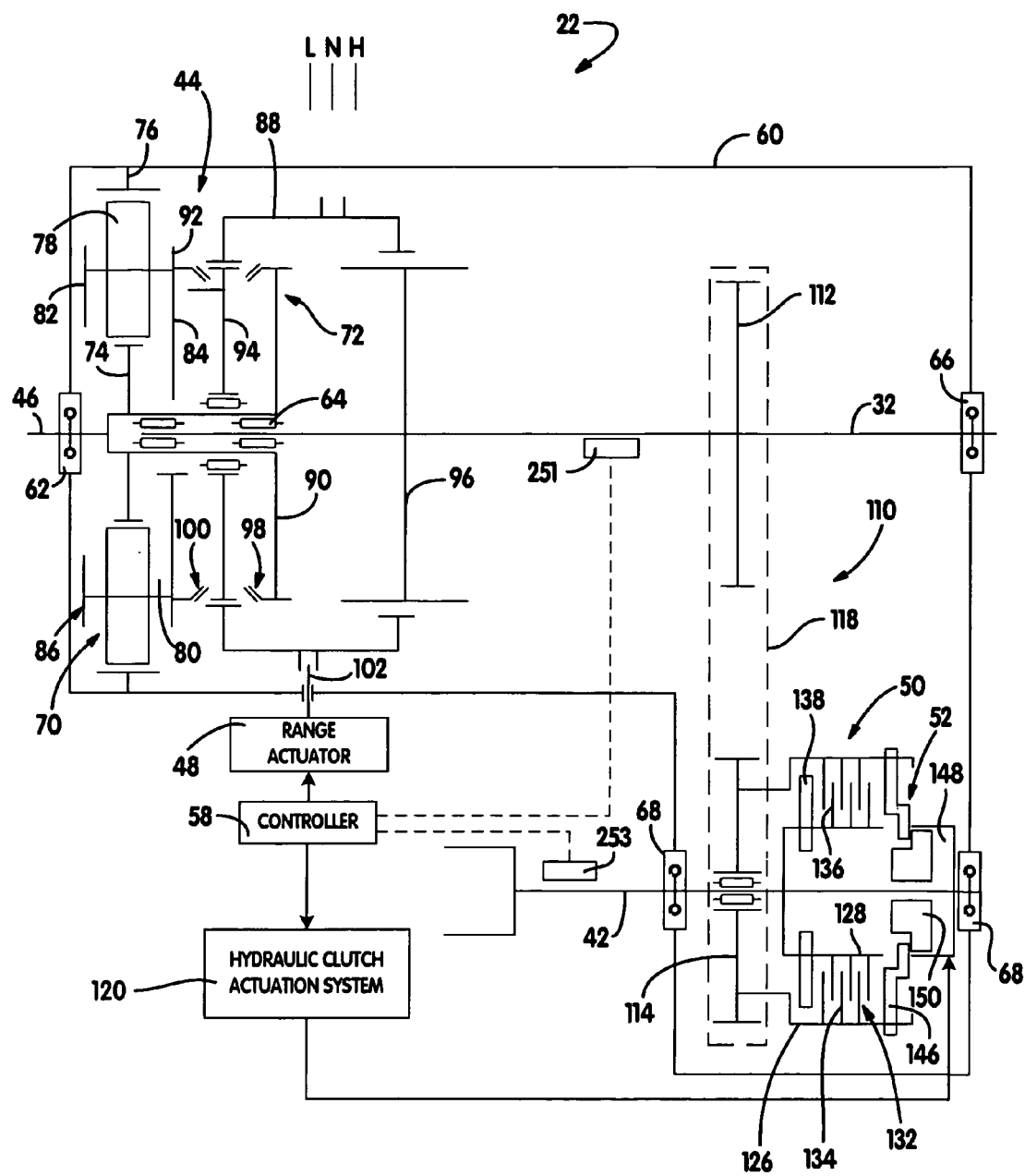
FIG. 2 is a schematic illustration of a transfer case equipped with the on-demand torque transfer mechanism which is controlled by a hydraulic clutch actuation system of the present invention.

Transfer case 22 is shown schematically in FIG. 2 to include a housing 60 from which input shaft 46 is rotatably supported by bearing assembly 62. Input shaft 46 is adapted for connection to the output shaft of transmission 20. Rear output shaft 32 is also shown rotatably supported between input shaft 46 and housing 60 via bearing assemblies 64 and 66 while front output shaft 42 is rotatably supported from housing 60 by a pair of bearing assemblies 68. Range clutch 44 is shown to include a planetary gearset 70 and a synchronized range shift mechanism 72. Planetary gearset 70 includes a sun gear 74 fixed for rotation with input shaft 46, a ring gear 76 non-rotatably fixed to housing 60, and a set of planet gears 78 rotatably supported on pinion shafts 80 extending between front and rear carrier rings 82 and 84, respectively, that are interconnected to define a carrier 86.

Planetary gearset 70 functions as a two-speed reduction unit which, in conjunction with a sliding range sleeve 88 of synchronized range shift mechanism 72, is operable to establish either of a first or second drive connection between input shaft 46 and rear output shaft 32. To establish the first drive connection, input shaft 46 is directly coupled to rear output shaft 32 for defining a high-range drive mode in which rear output shaft 32 is driven at a first (i.e., direct) speed ratio relative to input shaft 46. Likewise, the second drive connection is established by coupling carrier 86 to rear output shaft 32 for defining a low-range drive mode in which rear output shaft 32 is driven at a second (i.e., reduced) speed ratio relative to input shaft 46. A neutral non-driven mode is established when rear output shaft 32 is disconnected from both input shaft 46 and carrier 86.

Synchronized range shift mechanism 72 includes a first clutch plate 90 fixed for rotation with input shaft 46, a second clutch plate 92 fixed for rotation with rear carrier ring 84, a clutch hub 94 rotatably supported on input shaft 46 between clutch plates 90 and 92, and a drive plate 96 fixed for rotation with rear output shaft 32. Range sleeve 88 has a first set of internal spline teeth that are shown meshed with external spline teeth on clutch hub 94, and a second set of internal spline teeth that are shown meshed with external spline teeth on drive plate 96. As will be detailed, range sleeve 88 is axially moveable between three distinct positions to establish the high-range, low-range and neutral modes. Range shift mechanism 72 also includes a first synchronizer assembly 98 located between hub 94 and first clutch plate 90 and a second synchronizer assembly 100 is disposed between hub 94 and second clutch plate 92. Synchronizers 98 and 100 work in conjunction with range sleeve 88 to permit on-the-move range shifts.

With range sleeve 88 located in its neutral position, as denoted by position line "N", its first set of spline teeth are disengaged from the external clutch teeth on first clutch plate 90 and from the external clutch teeth on second clutch plate 92. First synchronizer assembly 98 is operable for causing speed synchronization between input shaft 46 and rear output shaft 32 in response to sliding movement of range sleeve 88 from its N position toward a high-range position, denoted by position line "H". Upon completion of speed synchronization, the first set of spline teeth on range sleeve 88 move into meshed engagement with the external clutch teeth on first clutch plate 90 while its second set of spline teeth are maintained in engagement with the spline teeth on drive plate 96. Thus, movement of range sleeve 88 to its H position acts to couple rear output shaft 32 for common rotation with input shaft 46 and establishes the high-range drive connection therebetween. Similarly, second synchronizer assembly 100 is operable for causing speed synchronization between carrier 86 and rear output shaft 32 in response to sliding movement of range sleeve 88 from its N position to a low-range position, as denoted by position line "L". Upon completion of speed synchronization, the first set of spline teeth on range sleeve 88 move into meshed engagement with the external clutch teeth on second clutch plate 92 while the second set of spline teeth on range sleeve 88 are maintained in engagement with the external spline teeth on drive plate 96. Thus with range sleeve 88 located in its L position, rear output shaft 32 is coupled for rotation with carrier 86 and establishes the low-range drive connection between input shaft 46 and rear output shaft 32.

To provide means for moving range sleeve 88 between its three distinct range positions, range shift mechanism 72 further includes a range fork 102 coupled to range sleeve 88 and which is mounted on a shift rail (not shown) for axial movement thereon. Range actuator 48 is a power-operated mechanism that is operable to move range fork 102 on the shift rail for causing corresponding axial movement of range sleeve 88 between its three range positions. Range actuator 48 may include an electric motor that is arranged to move range sleeve 88 to a specific range position in response to a control signal from controller 58 based on the signal delivered to controller 58 from mode select mechanism 56. As an alternative, range actuator 48 may be integrated into the hydraulic clutch actuation systems to be described in greater detail hereinafter.

It will be appreciated that the synchronized range shift mechanism permits "on-the-move" range shifts without the need to stop the vehicle which is considered to be a desirable feature. However, other synchronized and non-synchronized versions of range clutch 44 can be used in substitution for the particular arrangement shown. Also, it is contemplated that range clutch 44 can be removed entirely from transfer case 22 such that input shaft 46 would directly drive rear output shaft 32 to define a one-speed version of the on-demand transfer case embodying the present invention.

Referring now primarily to FIG. 2 of the drawings, transfer clutch 50 is shown arranged in association with front output shaft 42 in such a way that it functions to selectively deliver drive torque from a transfer assembly 110 driven by rear output shaft 32 to front output shaft 42 for establishing the four-wheel drive modes. Transfer assembly 110 includes a first sprocket 112 fixed for rotation with rear output shaft 32, a second sprocket 114 rotatably supported on front output shaft 42, and a power chain 118 encircling sprockets 112 and 114. As will be detailed, a hydraulic clutch actuation system 120 is operably associated with clutch actuator 52 for use in controlling actuation of transfer clutch 50.

Transfer clutch 50 is shown to include an annular drum 126 coupled for rotation with sprocket 114, a hub 128 fixed for rotation with front output shaft 42 and a multi-plate clutch pack 132 operably disposed between drum 126 and hub 128. Clutch pack 132 includes a set of outer friction plates 134 splined to drum 126 and which are alternatively interleaved with a set of inner friction plates 136 splined to hub 128. A reaction plate 138 is shown fixed for rotation with, and axially restrained on, hub 128. Transfer clutch 50 also includes a pressure plate 146 that is splined for rotation with drum 126 and which is supported for axial sliding movement relative to drum 126. As is known, the axial position of pressure plate 146 relative to clutch pack 132 controls the clutch engagement force exerted on clutch pack 132, thereby controlling the amount of drive torque transferred from transfer assembly 110 to front output shaft 42.

Clutch actuator 52 includes an operator, such as a piston 150, that is supported for movement within a piston chamber 148. Piston 150 is adapted to apply a clutch engagement force on pressure plate 146 which corresponds to the fluid pressure acting on piston 150 within piston chamber 148. In particular, pressure plate 146 is axially moveable relative to clutch pack 132 between a first or "released" position and a second or "locked" position. With pressure plate 146 in its released position, a minimum clutch engagement force is exerted on clutch pack 132 such that virtually no drive torque is transferred from rear output shaft 32 to front output shaft 42, thereby establishing the two-wheel drive mode. In contrast, movement of pressure plate 146 to its locked position causes a maximum clutch engagement force to be applied to clutch pack 132 such that front output shaft 42 is, in effect, coupled for common rotation with rear output shaft 32, thereby establishing the part-time four-wheel drive mode. Accordingly, control of the position of pressure plate 146 between its released and locked positions permits adaptive regulation of the amount of drive torque transferred from rear output shaft 32 to front output shaft 42, thereby establishing the on-demand four-wheel drive mode. Piston 150 and pressure plate 146 can be separated by a thrust bearing assembly to permit relative rotation therebetween.

Figure 3:
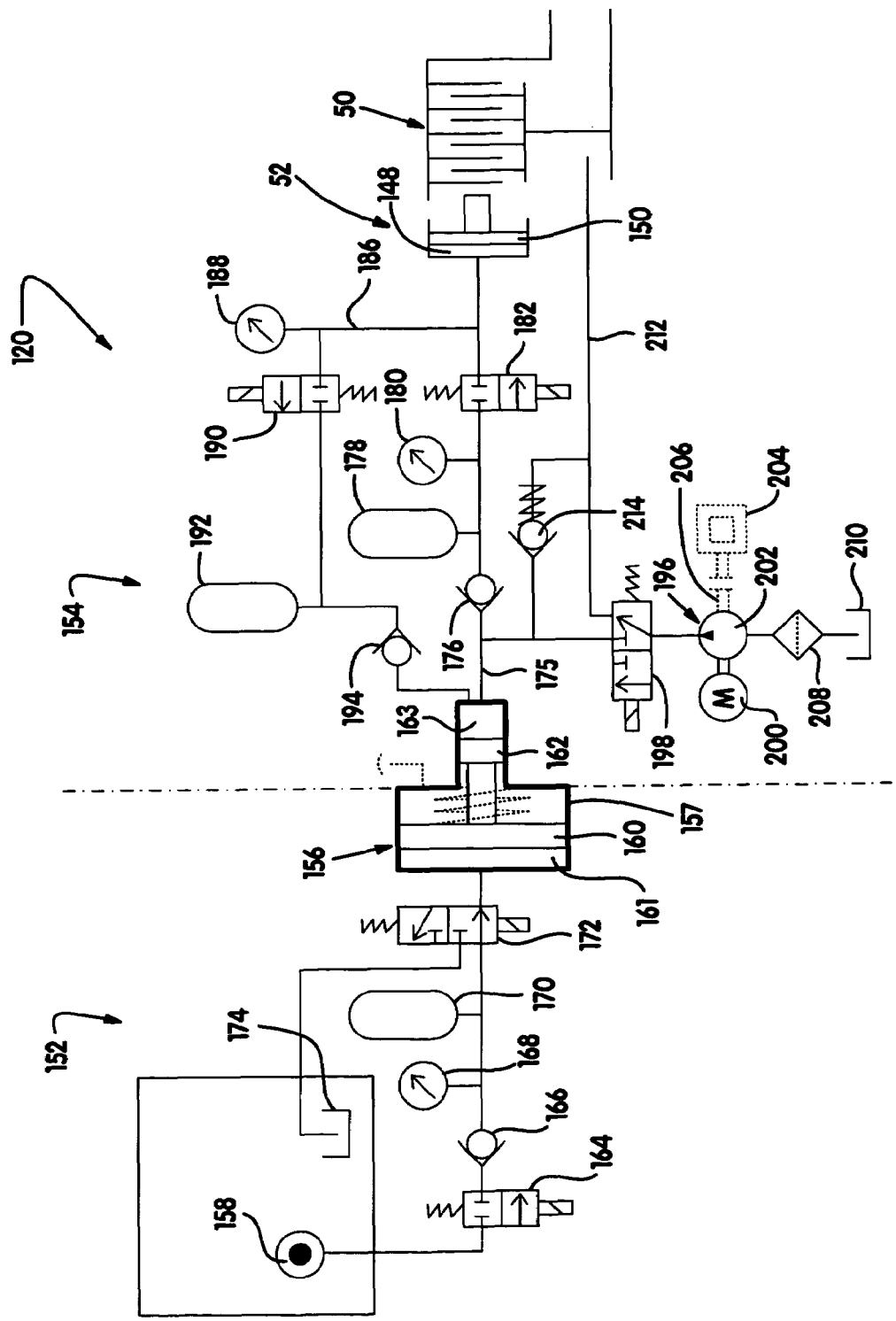
FIG. 3 is a schematic illustration of the hydraulic clutch actuation system according to a first embodiment of the present invention.

With reference to FIG. 3, hydraulic clutch actuation system 120 is shown to include a primary circuit 152 and a secondary circuit 154. Primary circuit 152 controls a first fluid that is maintained at a relatively low pressure of, for example, approximately 20 Bar. As seen, primary circuit 152 is coupled to secondary circuit 154 by a pressure intensifier 156. Pressure intensifier 156 functions to amplify the fluid pressure of a second fluid within secondary circuit 154 to a relatively high fluid pressure of, for example, approximately 200 Bar. The first fluid is supplied to the low pressure side of pressure intensifier 156 by a readily available pressure source 158 located within powertrain 16 such as, for example, an automatic transmission pump or any other powertrain fluid pressure/flow source. In addition, it is contemplated that other pressure sources, such as an independent motor-driven pump, may function as pressure source 158.

Pressure intensifier 156 includes a relatively large diameter low pressure piston 160 that is retained in a low pressure chamber 161 formed in a housing 157. Pressure intensifier 156 also includes a relatively small diameter high pressure piston 162 that is coupled by a spring-biased connector rod to low pressure piston 160. As seen, high pressure piston 162 is retained in a high pressure chamber 163 also formed in housing 157. The fluid pressure within chamber 161 acts on the large surface area of low pressure piston 160 to generate a force that is transferred to high pressure piston 162. Because high pressure piston 162 has significantly less surface area than low pressure piston 160, the fluid pressure within high pressure chamber 163 is greater than the fluid pressure in low pressure chamber 161. Specifically, the pressure in chamber 163 acting on high pressure piston 162 is greater than the pressure in chamber 161 acting on low pressure piston 160 by a ratio corresponding to the effective areas of the pistons. In the example noted, the surface area of low pressure piston 160 is ten times greater than the surface area of high pressure piston 162, thereby producing a 10:1 amplification of the fluid pressure across pressure intensifier 156.

Both primary circuit 152 and secondary circuit 154 each include accumulators, gauges and valves required to control the supply and release of pressurized fluid to the various hydraulic elements. By configuring hydraulic clutch actuation system 120 in this manner, the fluids used in primary circuit 152 and secondary circuit 154 are completely separate. Therefore, hydraulic clutch actuation system 120 of the present invention may be implemented in systems where cleanliness of the fluid is a greater concern within one system than the other. Additionally, secondary circuit 154 may also be controlled to supply pressure to engage or disengage an on-demand lubrication pump to define a high efficiency lubrication system having low power consumption.

With continued reference to FIG. 3, primary circuit 152 is shown to include a first control valve 164, a first check valve 166, a first pressure sensor 168, a first accumulator 170, a second control valve 172 and a sump 174. First control valve 164 controls fluid flow into the primary circuit from existing pressure source 158. First control valve 164 is shown as a spring-biased, solenoid actuated, directional control valve. First control valve 164 is preferably controlled via pulse width modulation. First control valve 164 is one component of a control loop for regulating the pressure in first accumulator 170 as will be described in greater detail hereinafter. First check valve 166 allows flow in the direction from existing pressure source 158 to first accumulator 170 but blocks flow in the reverse direction. First pressure sensor 168 is used to monitor the fluid pressure within first accumulator 170.

Secondary circuit 154 includes a supply line 175 in communication with the fluid within high pressure piston chamber 163. Secondary circuit 154 also includes a second check valve 176, a second accumulator 178, a second pressure sensor 180 and a third control valve 182. Supply line 175 provides highly pressurized fluid to piston chamber 148 of clutch actuator 52. As noted, piston 150 is positioned for movement within piston chamber 148 and acts to control the amount of drive torque transferred across transfer clutch 50. A return line 186 includes a third pressure sensor 188, a fourth control valve 190, a third accumulator 192 and a third check valve 194.

A second pressure source 196 is plumbed in communication with a fifth control valve 198. Second pressure source 196 may be provided by an external motor 200 driving a pump 202, or by a gerotor pump 204 that can be selectively coupled to a driven shaft 206 associated with the device being controlled. For example, a gerotor pump driven by rear output shaft 32 of transfer case 22 could be employed. It should be appreciated that gerotor pump 204 may be driven by a mechanical connection or other connections such as electro-mechanical, electro-hydraulic, electromagnetic and/or another force producing mechanism. A filter 208 is coupled to a sump 210 to provide clean fluid for second pressure source 196. Fifth control valve 198 functions to provide a high flow, low pressure source for a lubrication circuit 212. Lubrication circuit 212 supplies fluid which acts as a coolant to lubricate and cool clutch pack 132 of transfer clutch 50. Fifth control valve 198 may also be actuated to direct pressurized fluid from second pressure source 196 to second accumulator 178 in the event that the primary circuit is disabled or unavailable. A pressure relief valve 214 provides fluid to lubrication circuit 212 after a predetermined pressure is exceeded during pressurization of second accumulator 178.

Pressure source 158 is coupled to first accumulator 170 by actuating first control valve 164 to allow pressurized fluid to pass through first check valve 166 and be monitored by first pressure sensor 168. First pressure sensor 168 and first control valve 164 are in communication with a primary pressure control unit 216 (FIG. 4) to form a closed loop control system for maintaining a desired pressure within first accumulator 170. Second control valve 172 is normally operable for allowing pressure from first accumulator 170 to communicate with low pressure chamber 161 so as to act on low pressure piston 160. However, second control valve 172 may be selectively actuated to interrupt the flow path between first accumulator 170 and low pressure chamber 161 while providing a flow path for fluid in low pressure piston 161 to be returned to reservoir or sump 174.

Primary pressure control unit 216 evaluates information provided from first pressure sensor 168 and pressure source 158 to control proper actuation of first control valve 164. Information regarding pressure source 158 is fed forward to primary pressure control unit 216, as indicated by block 215, and is used to reduce the response time required to maintain the fluid pressure in second accumulator 178 within a desired range. However, it should be appreciated that a closed loop feedback control system may be implemented without departing from the scope of the present invention.

Figure 4:
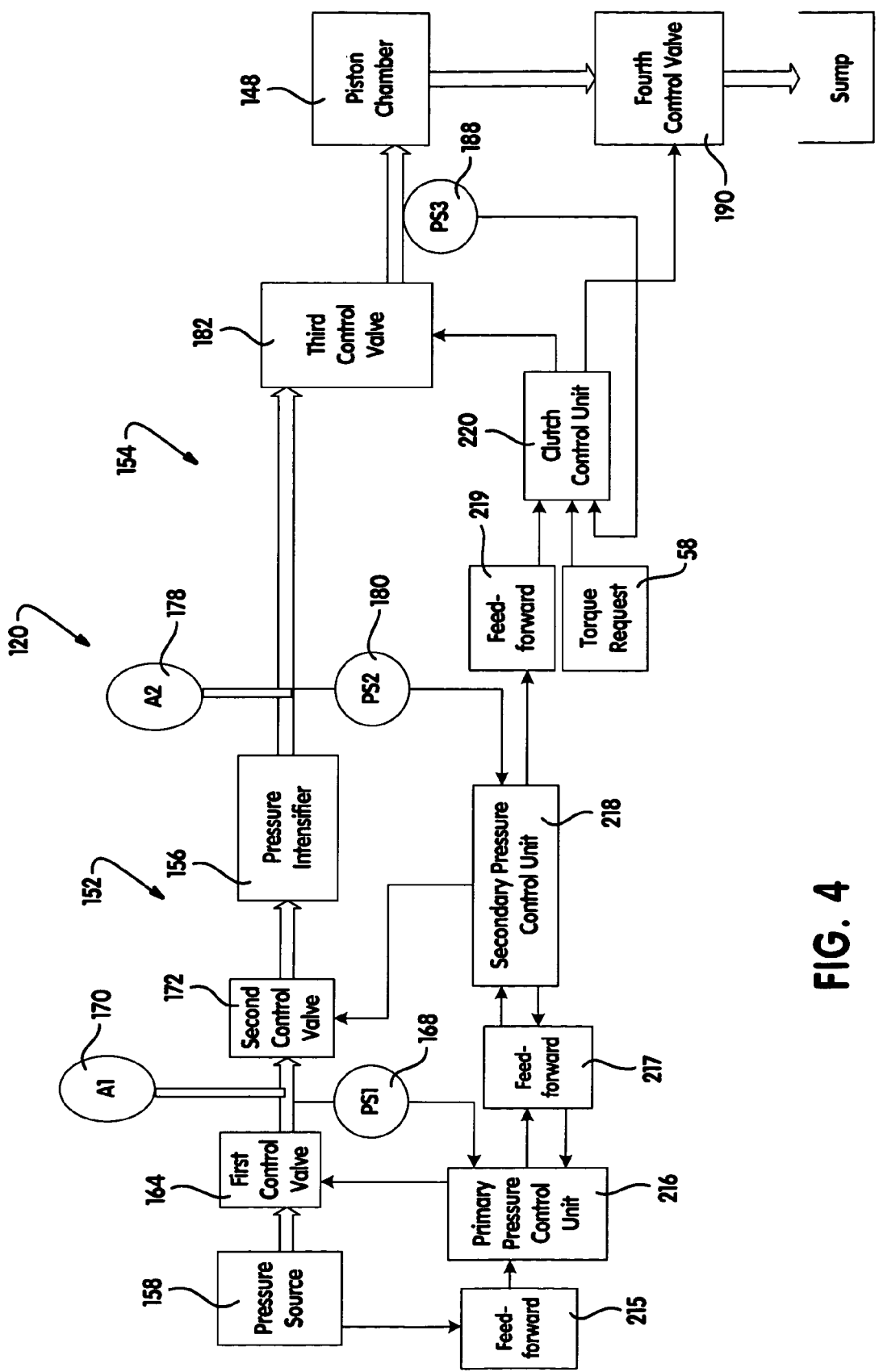
FIG. 4 is a schematic illustration representing a control system for the hydraulic clutch actuation system shown in FIG. 3.

As shown in FIG. 4, primary pressure control unit 216 also obtains information from a secondary pressure control unit 218, as indicated by feed forward block 217. Second pressure control unit 218 is in communication with second control valve 172, second pressure sensor 180 and primary pressure control unit 216. As mentioned earlier, primary pressure control unit 216 functions to maintain the fluid pressure within first accumulator 170 within a desired pressure range. Specifically, as the pressure within first accumulator 170 reaches a low limit, first control valve 164 is opened to allow pressure source 158 to increase the pressure within first accumulator 170 until an upper limit of the desired pressure range is reached. At this time, first control valve 164 is closed. Primary pressure control unit 216 also functions to connect pressure source 158 with first accumulator 170 if a pressure drop greater than a predetermined rate occurs at second pressure sensor 180. In this manner, first accumulator 170 is supplied with fluid from pressure source 158 in anticipation of a need for additional pressure in secondary circuit 154.

Secondary pressure control unit 218 functions to maintain a predetermined fluid pressure range within second accumulator 178. Secondary pressure control unit 218 controls selective actuation of second control valve 172 to supply low pressure fluid to low pressure piston 160 in order to drive high pressure piston 162 forward, thereby supplying additional fluid past second check valve 176 into second accumulator 178. This procedure continues until second pressure control unit 218 receives a signal from second pressure sensor 180 that an upper limit of the desired pressure range of second accumulator 178 has been met.

A clutch control unit 220 receives data from second pressure sensor 180 via feed forward block 219, third pressure sensor 188 and controller 58. Upon demand, controller 58 provides a torque request to clutch control unit 220. Based on the magnitude of the torque request, clutch control unit 220 compares the fluid pressure within piston chamber 148 (as indicated by third pressure sensor 188) with the available pressure within second accumulator 178 (as indicated by second pressure sensor 188). If the proper conditions have been met, third control valve 182 is signaled to supply high pressure fluid to piston chamber 148 and actuate transfer clutch 50.

When the vehicle operating conditions indicate that the torque request can be eliminated, third control valve 182 is closed and fourth control valve 190 is opened. As such, pressurized fluid from piston chamber 148 travels through return line 186 to third accumulator 192 which, in turn, acts as a low pressure fluid storage reservoir. Furthermore, third accumulator 192 is arranged to compensate for changes in volume in second accumulator 178. Specifically, third accumulator 192 provides a source of fluid for high pressure chamber 163 of pressure intensifier 156 as piston 162 retracts during the reciprocal pumping action required to pressurize second accumulator 178. Third check valve 194 functions to block the flow of fluid from the highly pressurized portion of pressure intensifier 156 to third accumulator 192 during the process of pressuring second accumulator 178. It should be appreciated that primary circuit 152 acts in conjunction with secondary circuit 154 when a torque demand is discontinued. In addition to opening fourth control valve 190, second control valve 172 is actuated to discontinue the supply of low pressure fluid from first accumulator 170. Thus, the fluid in low pressure chamber 161 is allowed to pass through second control valve 172 and drain back to sump 174.

In the event that primary circuit 152 has become disabled, second pressure source 196 is coupled to second accumulator 178 by actuating fifth control valve 198. Preferably, second pressure source 196 is configured as positive displacement pump 202 driven by motor 200. As will be described in greater detail hereinafter, gerotor pump 204 may be coupled to driven shaft 206 to provide efficient pumping of fluid to lubrication path 212 or second accumulator 178.

Figure 5:
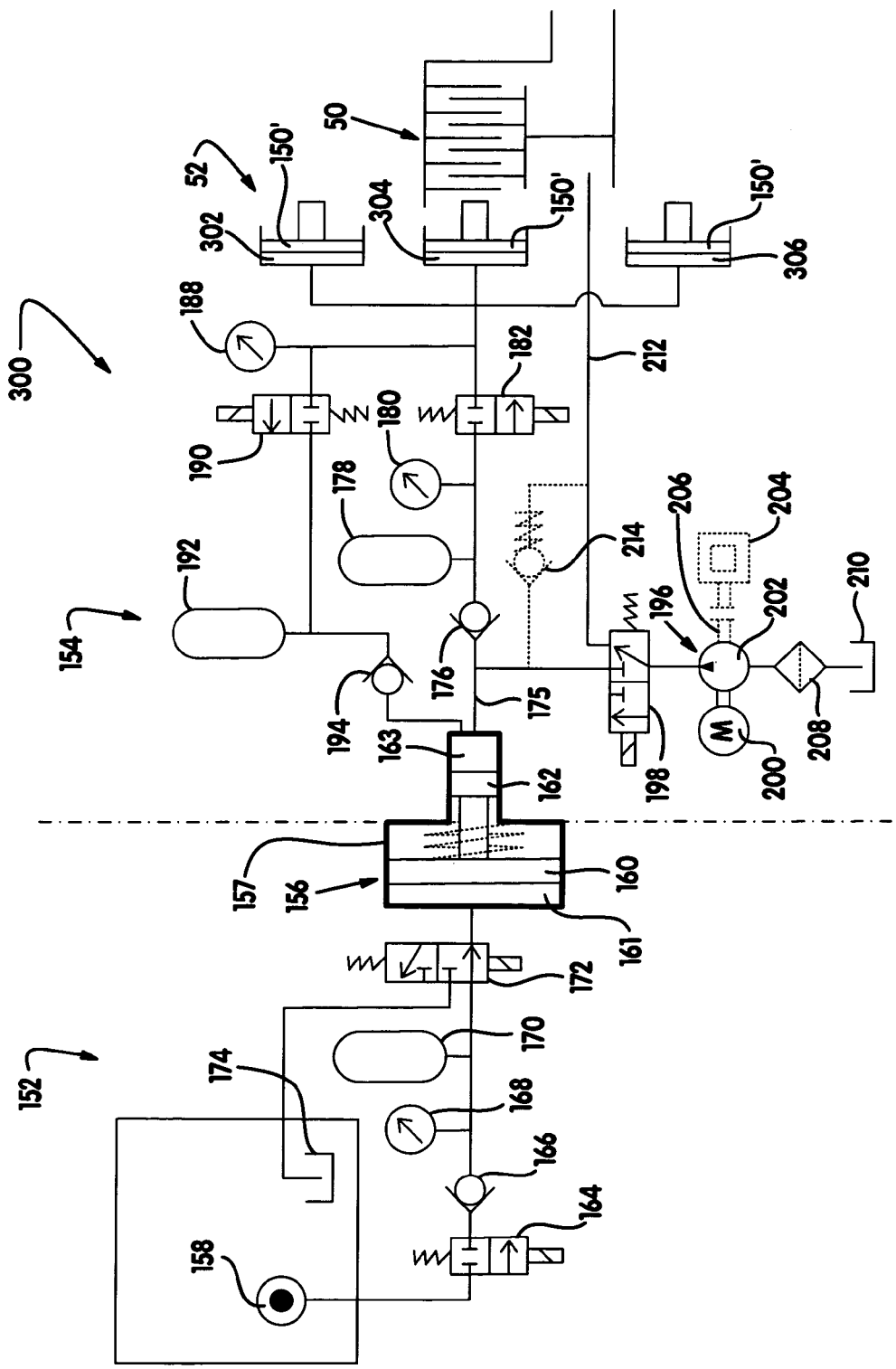
FIG. 5 is a schematic illustration of the hydraulic clutch actuation system according to an alternative embodiment of the present invention.

FIG. 5 depicts an alternate hydraulic clutch actuation system 300. Since hydraulic clutch actuation system 300 is similar to hydraulic clutch actuation system 120, like elements will be identified with the reference numerals previously presented. Hydraulic clutch actuation system 300 includes a clutch actuator 52 having a plurality of piston chambers 302, 304 and 306, each of which is in fluid communication with third control valve 182. Piston chambers 302, 304 and 306 are preferably circumferentially spaced apart from one another and each supports a piston 150' for movement therein. The pressure in the piston chambers act on pistons 150' which, in turn, apply a clutch engagement force to pressure plate 146 of transfer clutch 50. Alternatively, piston chambers 302, 304 and 306 may be used to concurrently actuate a number of clutches and/or brakes using the same control signal from third control valve 182.

Figure 6:
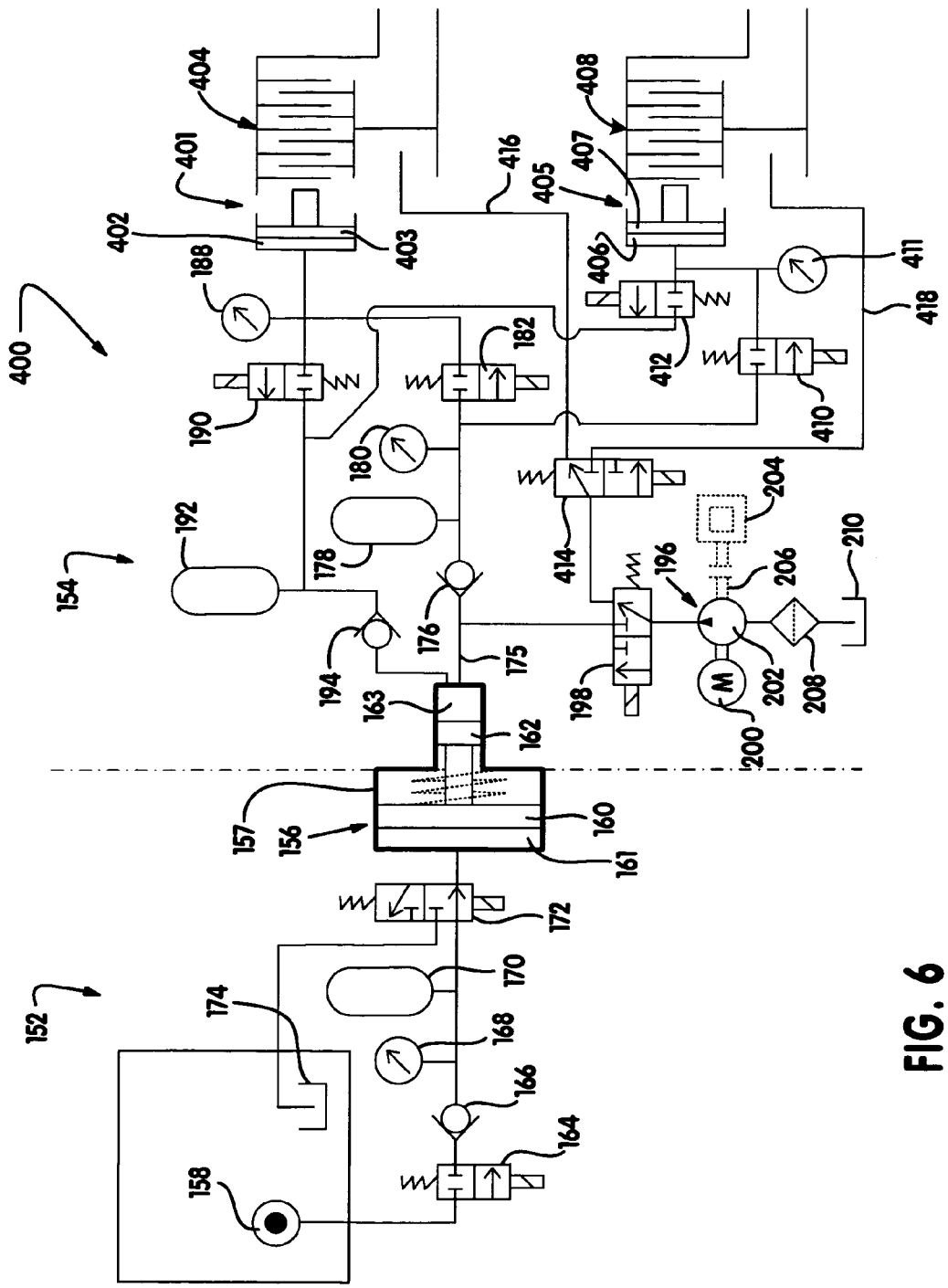
FIG. 6 is a schematic illustration of the hydraulic clutch actuation system according to yet another alternative embodiment of the present invention having multiple individually controllable clutches.

FIG. 6 presents another alternate hydraulic clutch actuation system 400. In many respects, hydraulic clutch actuation system 400 is similar to hydraulic clutch actuation systems 120 and 300 previously described. Accordingly, like elements will again be identified with their previously introduced reference numerals. The primary distinction, however, is that hydraulic clutch actuation system 400 permits independent control of two or more devices using a common primary circuit 152 and a single pressure intensifier 156. In this regard, hydraulic clutch actuation system 400 includes a first clutch actuator 401 having a piston chamber 402 with a first piston 403 operable for controlling actuation of a first transfer clutch 404 and a second clutch actuator 405 having a second piston chamber 406 with a second piston 407 operable for controlling actuation of a second transfer clutch 408. Control of the fluid pressure within piston chamber 402 of first clutch actuator 401 is substantially similar to that described above for controlling the fluid pressure in piston chamber 148 of clutch actuator 52. However, the fluid pressure within second piston chamber 406 can be controlled independently of the fluid pressure within first piston chamber 402. This is accomplished by adding a sixth control valve 410 that is operable to supply highly pressurized fluid from second accumulator 178 to second piston chamber 406 and a fourth pressure sensor 411 for detecting the fluid pressure within piston chamber 406. In addition, a seventh control valve 412 can be selectively actuated to relieve pressure from second piston chamber 406 and supply fluid to third accumulator 192. Finally, an eighth control valve 414 interconnects a first lubrication pipeline 416 to first clutch 404 as well as a second lubrication pipeline 418 to second clutch 408. Eighth control valve 414 may be actuated to selectively cool and lubricate first transfer clutch 404 or second transfer clutch 408 as required. Alternatively, eighth control valve 414 may be configured to supply each clutch with lubricating fluid.

Hydraulic clutch actuation system 400 offers the benefit of permitting independent actuation of two or more devices within the motor vehicle driveline utilizing a remotely located primary circuit 152 and pressure intensifier 156. As such, a plurality of secondary hydraulic circuits can be connected to the output of pressure intensifier 156. Each secondary circuit will control actuation of one or more devices (i.e., friction clutch, shift clutch, brake, etc.) in common power transfer units and/or different power transfer units located with the driveline. These power transfer units can include, without limitation, transfer cases, in-line couplings, limited slip axle differentials, power take-off units, automatic transmission, automated-shift synchromesh transmissions and the like. In addition, the hydraulic pressure generated and controlled in each secondary circuit can be used to control movement (axial or radial) of clutch operator components other than pistons such as, for example, rotary cams, ball ramps, roller ramps, pivotal levers, linkages and the like.

Figure 7:
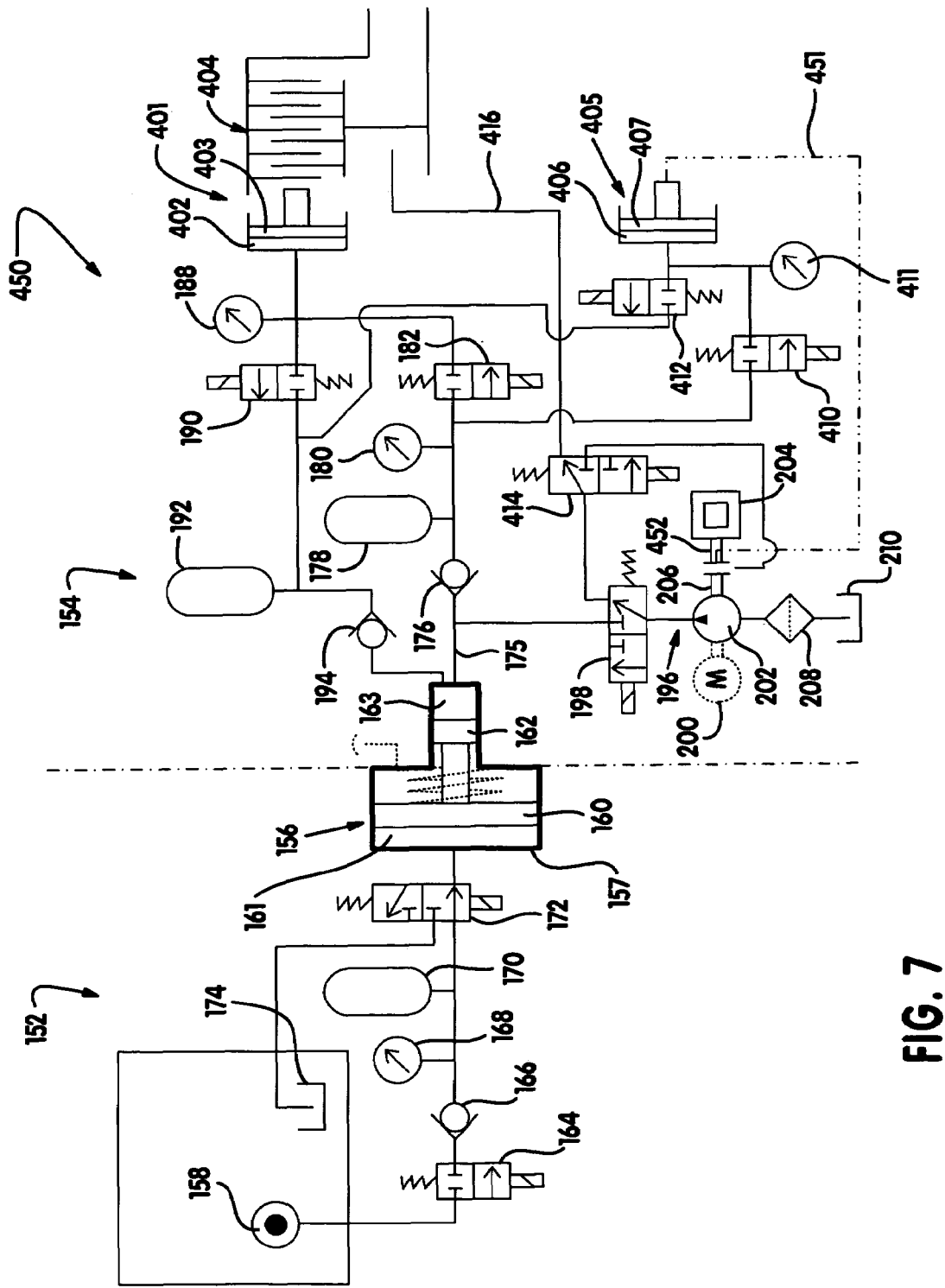
FIG. 7 is a schematic illustration of another alternate embodiment of the hydraulic clutch actuation system which includes a lubrication pump actuation subsystem.

FIG. 7 is a schematic representation of another alternate embodiment of a hydraulic clutch actuation system 450. Hydraulic clutch actuation system 450 is similar to hydraulic clutch actuation system 400. Accordingly, like elements will retain their previously introduced reference numerals. Hydraulic clutch actuation system 450 includes a circuit 451 coupling the output of second clutch actuator 405 to an inner rotor 452 of gerotor pump 204. Hydraulic clutch actuation system 450 allows more efficient operation of the power transmission device by not requiring continuous pumping of lubrication to transfer clutch 404. To achieve this goal, motor 200 is not continuously powered during operation. Similarly, inner rotor 452 is not continuously driven, but is only selectively coupled to driven shaft 206. When controller 58 anticipates a need for on-demand clutch actuation, sixth control valve 410 is shifted to provide high pressure fluid from second accumulator 178 to second piston chamber 406. At this time, movement of second piston 407 causes circuit 451 to couple inner rotor 452 for rotation with driven shaft 206. Because driven shaft 206 rotates continuously during operation of the power transmission device, pumping of fluid from second pressure source 196 is efficiently achieved. Circuit 451 is identified by a dashed line that represents either a hydraulic or mechanical output used for releaseably coupling rotor 252 to pump shaft 206.

Pressurized fluid is supplied from second pressure source 196 through fifth control valve 198 and eighth control valve 414 as a lubricant/coolant to transfer clutch 404. Fifth control valve 198 and eighth control valve 414 are normally positioned to provide the lubrication path described. The energy required to lock inner rotor 452 to driven shaft 206 is minimal. It should be appreciated that inner rotor 452 may be coupled to a variety of rotating shafts within the device containing hydraulic clutch actuation system 450. As mentioned, a mainshaft of a transmission or a transfer case may be used. Also, belt driven devices, a pinion shaft or other rotating member may provide the energy required to pump fluid from pressure source 196.

Once inner rotor 452 has been coupled to driven shaft 206 and transfer clutch 404 is fully engaged, seventh control valve 412 and sixth control valve 410 are closed to maintain pressure acting on second piston chamber 406. Fifth control valve 198 is then shifted to provide flow from second pressure source to second accumulator 178. By operating hydraulic clutch actuation system 450 in this manner, electrical current draw from motor 200 is greatly reduced.

Returning to a more global view of power transfer system operation as depicted in FIGS. 1 and 2, when mode select mechanism 56 indicates selection of the two-wheel high-range drive mode, range actuator 48 is signaled to move range sleeve 88 to its H position and transfer clutch 50 is maintained in a released condition and no torque requirement signal is sent to clutch control unit 220, whereby all drive torque is delivered to rear output shaft 32. If mode select mechanism 56 thereafter indicates selection of a part-time four-wheel high-range mode, range sleeve 88 is maintained in its H position and an electrical control signal is sent by controller 58 to clutch control unit 220 to force piston 150 to move pressure plate 146 axially from a disengaged position until a maximum clutch engagement force is delivered to clutch pack 132 for effectively coupling hub 128 for common rotation with drum 126.

If a part-time four-wheel low-range drive mode is selected, the operation of transfer clutch 50 identical to that described above for the part-time high-range drive mode. However, in this mode, range actuator 48 is signaled to locate range sleeve 88 in its L position to establish the low-range drive connection between input shaft 46 and rear output shaft 32. It is contemplated that hydraulic clutch actuation system 400 of FIG. 6 could be used to control independent actuation of range actuator 48 and transfer clutch 50.

When the mode signal indicates selection of the on-demand four-wheel high-range drive mode, range actuator 48 moves or maintains range sleeve 88 in its H position and hydraulic clutch actuation system 120 is placed in a ready or "stand-by" condition. Specifically, the minimum amount of drive torque sent to front output shaft 42 through transfer clutch 50 in the stand-by condition can be zero or a slight amount (i.e., in the range of 2-10%) as required for the certain vehicular application. This minimum stand-by torque transfer is generated by controller 58 sending a control signal having a predetermined minimum torque request to clutch control unit 220. Thereafter, controller 58 determines when and how much drive torque needs to be transferred to front output shaft 42 based on tractive conditions and/or vehicle operating characteristics detected by vehicle sensors 54. For example, a first speed sensor 251 (FIG. 2) sends a signal to controller 58 indicative of the rotary speed of rear output shaft 32 while a second speed sensor 253 sends a signal indicative of the rotary speed of front output shaft 42. Controller 58 can vary the magnitude of the electrical signal sent to hydraulic clutch actuation system 120 between the predetermined minimum value and a predetermined maximum value based on defined relationships such as, for example, the speed difference between output shafts 32 and 42.

While transfer clutch 50 is shown arranged on front output shaft 42, it is evident that it could easily be installed on rear output shaft 32 for transferring drive torque to a transfer assembly arranged to drive front output shaft 42. Likewise, the present invention can be used as an in-line torque transfer coupling in an all wheel drive vehicle to selectively and/or automatically transfer drive torque on-demand from the primary (i.e., front) driveline to the secondary (i.e., rear) driveline. Likewise, in full-time transfer cases equipped with an interaxle differential, transfer clutch 50 could be used to limit slip and bias torque across the differential.

Figure 8:
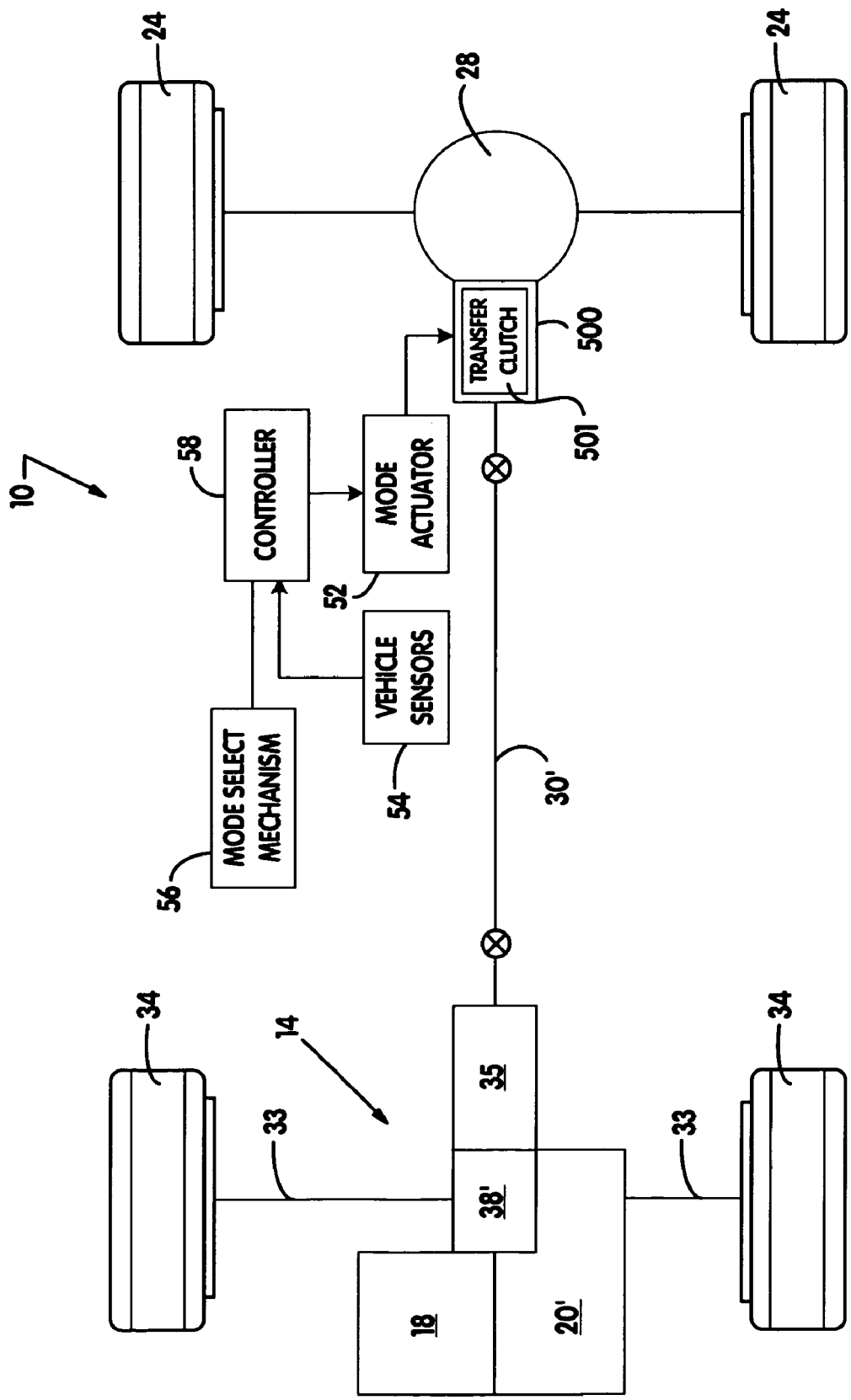
FIG. 8 illustrates an alternative drivetrain for a four-wheel drive vehicle equipped with a power transmission device of the present invention.

To illustrate another alternative power transmission device to which the present invention is applicable, FIG. 8 schematically depicts a front-wheel based four-wheel drive layout. In particular, engine 18 drives a multi-speed transmission 20' having an integrated front differential 38' for driving front wheels 34 via axle shafts 33. A power transfer unit 35 is also driven by transmission 20' for delivering drive torque to the input member of a torque transfer mechanism 500. As seen, torque transfer mechanism 500 is arranged as an in-line torque transfer coupling driven by drive shaft 30'. In particular, the input member of transfer coupling 500 is coupled to drive shaft 30' while its output member is coupled to a drive component of rear differential 28. Accordingly, when sensors indicate the occurrence of a front wheel slip condition, controller 58 adaptively controls actuation of torque coupling 500 such that drive torque is delivered "on-demand" to rear wheels 24.

Figure 9:
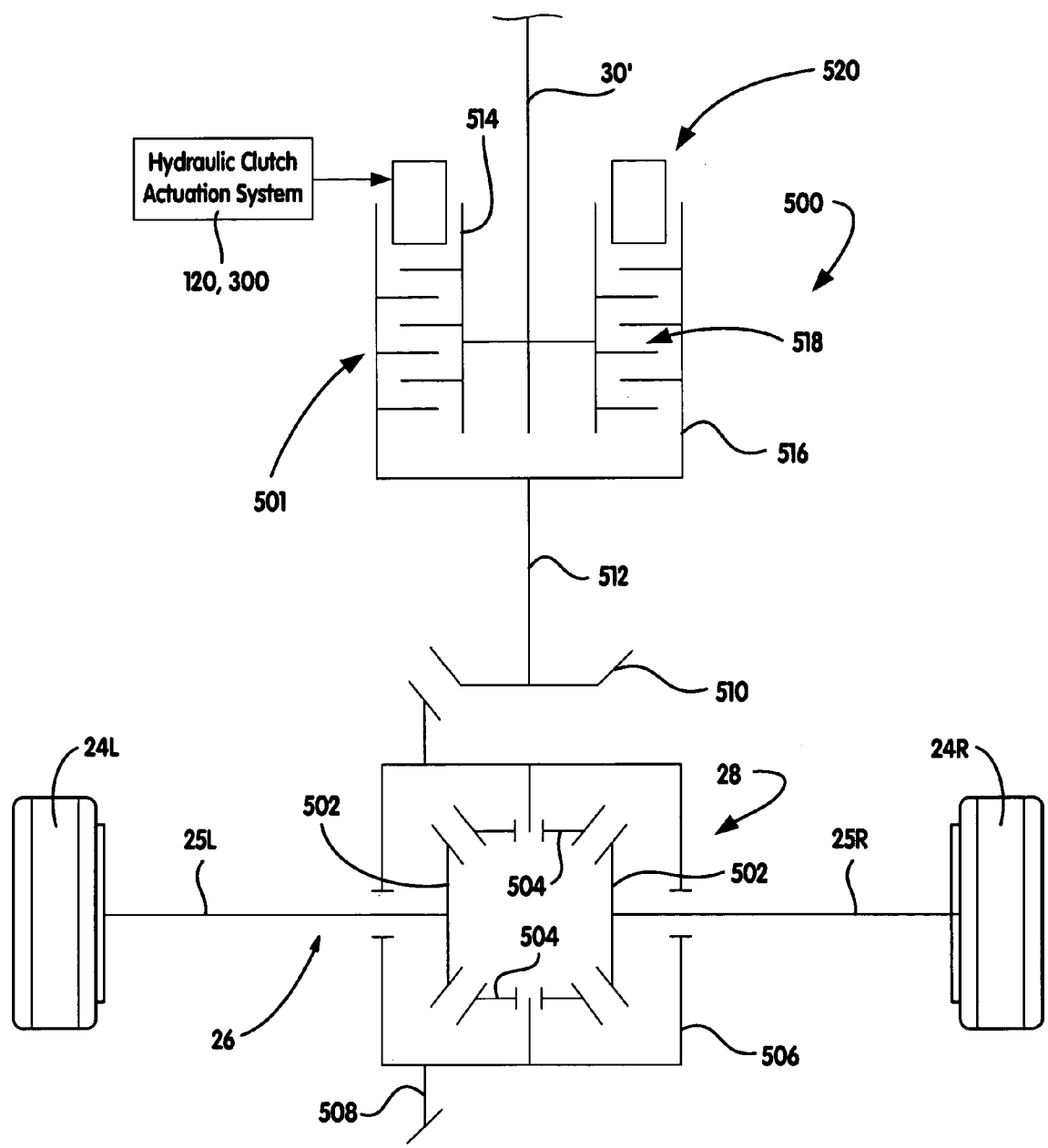
FIG. 9 is a schematic illustration of a rear drive module associated with the four-wheel drive vehicle shown in FIG. 8.

Referring to FIG. 9, torque coupling 500 is schematically illustrated operably disposed between drive shaft 30' and rear differential 28. Rear differential 28 includes a pair of side gears 502 that are connected to rear wheels 24L and 24R via rear axleshafts 25L and 25R, respectively. Differential 28 also includes pinions 504 that are rotatably supported on pinion shafts fixed to a carrier 506 and which mesh with side gears 502. A right-angled drive mechanism is also associated with rear differential 28 and includes a ring gear 508 fixed for rotation with carrier 506 and a drive pinion gear 510 meshed with ring gear 508. Pinion gear 510 is shown to be fixed for rotation with a pinion shaft 512.

Torque coupling 500 includes a mutli-plate clutch assembly 501 operably disposed between driveshaft 30' and pinion shaft 512 and which includes a hub 514 fixed for rotation with driveshaft 30', a drum 516 fixed for rotation with pinion shaft 512 and a clutch pack 518. Torque coupling 500 also includes a hydraulically-operated clutch actuator 520 for controlling the magnitude of the clutch engagement force applied to clutch assembly 501 and thus the amount of drive torque transferred from drive shaft 30' to rear differential 28. Preferably, clutch actuator 520 is controlled by a hydraulic clutch actuation system that is substantially similar to one of clutch actuation systems 120 and 300 previously disclosed.

Torque coupling 500 permits operation in any of the drive modes previously disclosed. For example, if the on-demand 4WD mode is selected, controller 58 regulates activation of mode actuator 520 in response to the operating conditions detected by sensors 54. Selection of the part-time 4WD mode results in complete engagement of clutch pack 518 such that pinion shaft 512 is, in effect, rigidly coupled to driveshaft 30'. Finally, in the two-wheel drive mode, clutch pack 518 is released such that pinion shaft 512 is free to rotate relative to driveshaft 30'. Alternatively, elimination of mode select mechanism 56 would provide automatic on-demand operation of torque coupling 500 in a manner completely transparent to the vehicle operator.

Figure 10:
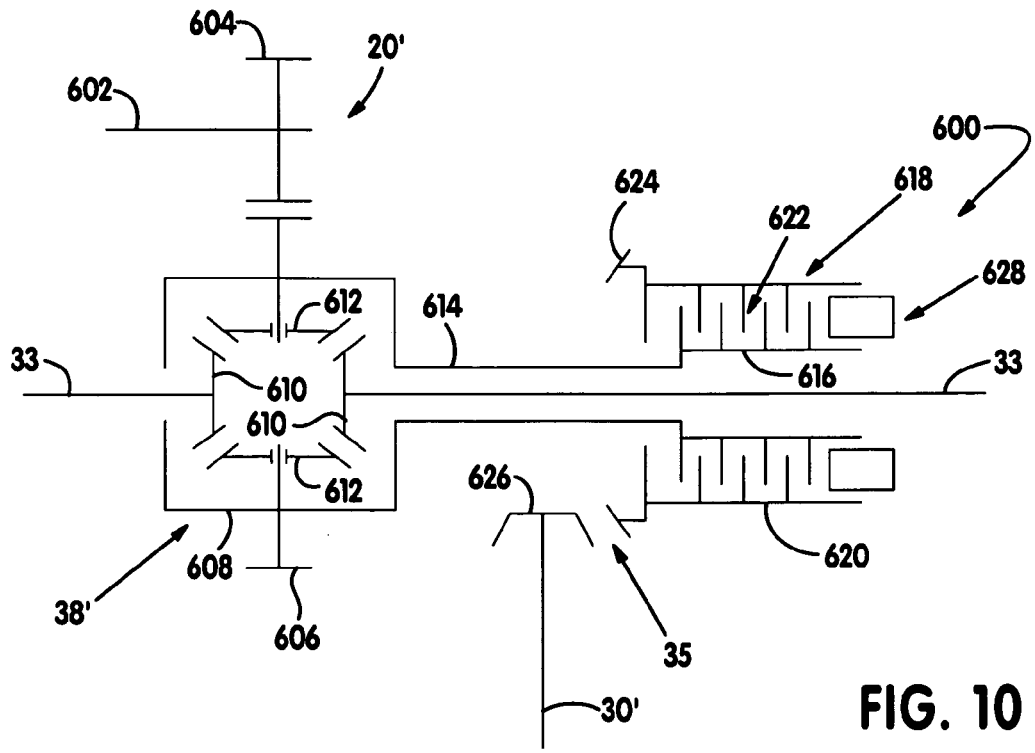
FIGS. 10 through 14 are schematic illustrations of alternative embodiments of power transmission devices according to the present invention.

Referring now to FIG. 10, a torque coupling 600 is now schematically illustrated in association with an on-demand four-wheel drive system based on a front-wheel drive vehicle similar to that shown in FIG. 8 except that torque coupling 600 is positioned to transfer drive torque from power transfer unit 35 to drive shaft 30'. In particular, an output shaft 602 of transmission 20' is shown to drive an output gear 604 which, in turn, drives an input gear 606 fixed to a carrier 608 associated with front differential 38'. To provide drive torque to front wheels 34L and 34R, front differential 38' includes a pair of side gears 610 that are connected to the front wheels via axleshafts 33L and 33R. Differential 38' also includes pinions 612 that are rotatably supported on pinion shafts fixed to carrier 608 and which are meshed with side gears 610. A transfer shaft 614 is provided to transfer drive torque from carrier 608 to a clutch hub 616 associated with a multi-pate clutch assembly 618. Clutch assembly 618 further includes a drum 620 and a clutch pack 622 having interleaved clutch plates operably connected between hub 616 and drum 620.

Transfer unit 35 is a right-angled drive mechanism including a ring gear 624 fixed for rotation with drum 620 of clutch assembly 618 and which is meshed with a pinion gear 626 fixed for rotation with drive shaft 30'. As seen, a hydraulically-actuated clutch actuator 628 is schematically illustrated for controlling actuation of clutch assembly 618. According to the present invention, operation of hydraulic clutch actuator 628 is controlled using any one of the various hydraulic clutch actuation systems previously described in that a first circuit provides low pressure fluid to a pressure intensifier which supplies a piston chamber with higher pressure fluid for causing a piston to engage clutch pack 622.

In operation, drive torque is transferred from the primary (i.e., front) driveline to the secondary (i.e., rear) driveline in accordance with the particular mode selected by the vehicle operator via mode selector 56. For example, if the on-demand 4WD mode is selected, controller 58 modulates actuation of hydraulic clutch actuator 628 in response to the vehicle operating conditions detected by sensors 54 by varying the value of the electric control signal sent to clutch control unit 220 (see FIG. 4). In this manner, the level of clutch engagement and the amount of drive torque that is transferred through clutch pack 622 to the rear driveline through transfer unit 35 and drive shaft 30' is adaptively controlled. Selection of a locked or part-time 4WD mode results in full engagement of clutch assembly 618 for rigidly coupling the front driveline to the rear driveline. In some applications, the mode selector 56 may be eliminated such that only the on-demand 4WD mode is available so as to continuously provide adaptive traction control without input from the vehicle operator.

Figure 11:
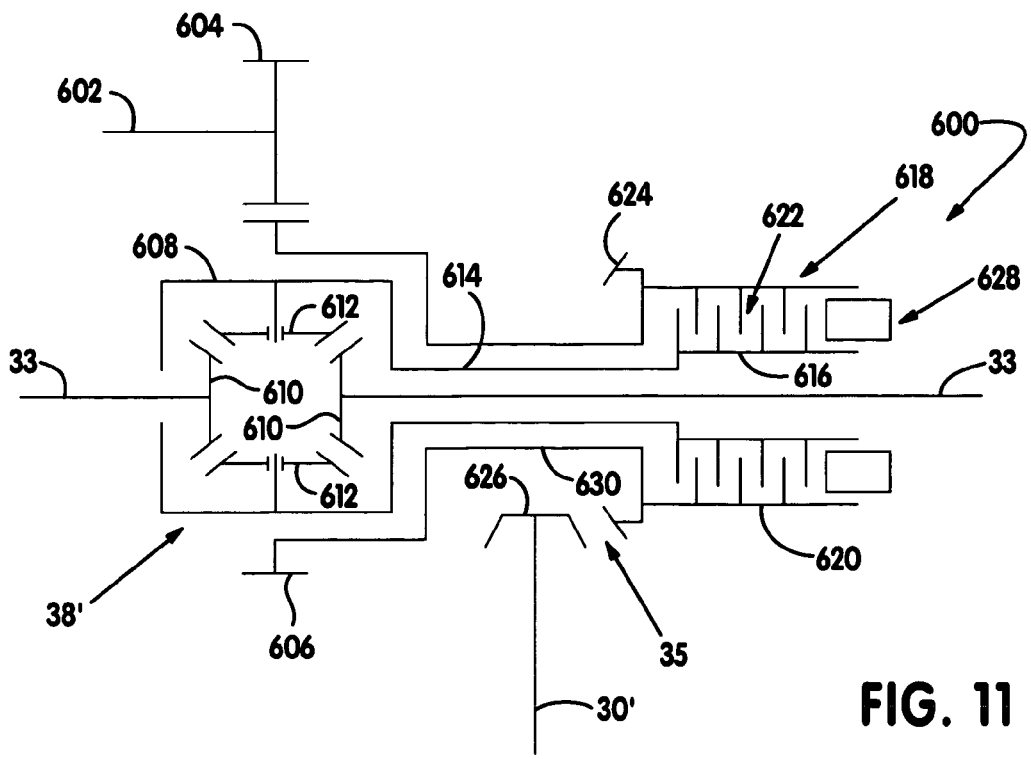

FIG. 11 illustrates a modified version of FIG. 10 wherein an on-demand four-wheel drive system based on a rear-wheel drive motor vehicle that is arranged to normally deliver drive torque to rear wheels 24 while selectively transmitting drive torque to front wheels 34 through torque coupling 600. In this arrangement, drive torque is transmitted directly from transmission output shaft 602 to transfer unit 35 via a drive shaft 630 interconnecting input gear 606 to ring gear 624. To provide drive torque to front wheels 34, torque coupling 600 is now shown operably disposed between drive shaft 630 and transfer shaft 614. In particular, clutch assembly 618 is arranged such that drum 620 is driven with ring gear 624 by drive shaft 630. As such, actuation of torque coupling 600 functions to transfer torque from drum 620 through clutch pack 622 to hub 616 which, in turn, drives carrier 608 of front differential unit 38' via transfer shaft 614.

Figure 12:
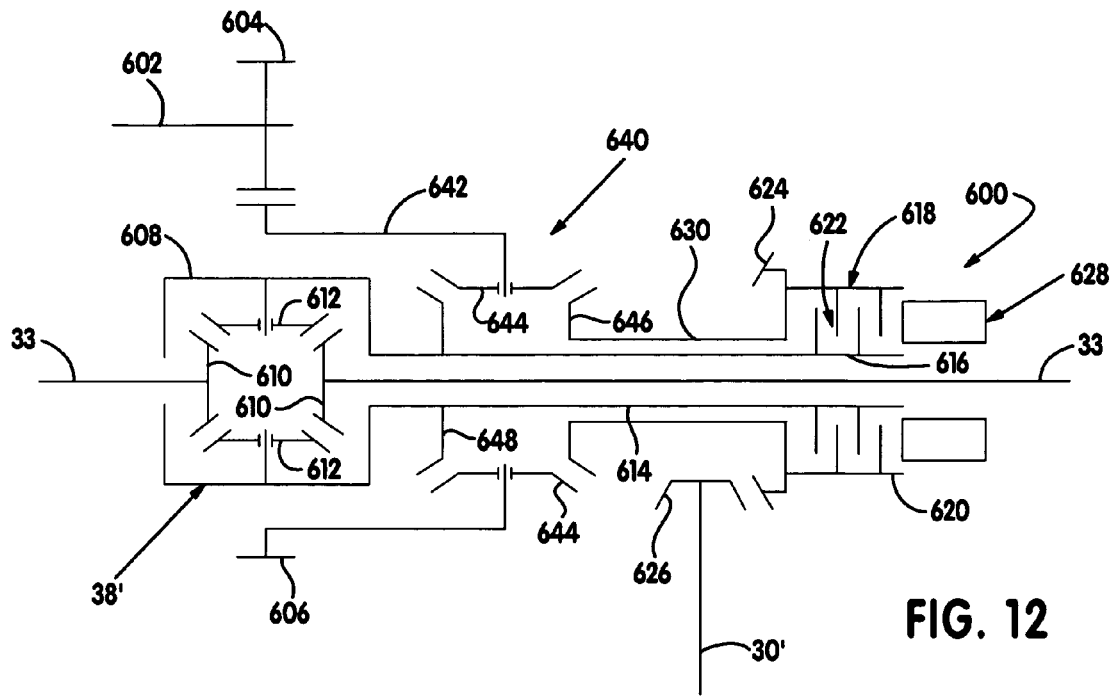

In addition to the on-demand 4WD systems shown previously, the power transmission (clutch actuator and clutch assembly) technology of the present invention can likewise be used in full-time 4WD systems to adaptively bias the torque distribution transmitted by a center or "interaxle" differential to the front and rear drivelines. For example, FIG. 12 schematically illustrates a full-time four-wheel drive system which is generally similar to the on-demand four-wheel drive system shown in FIG. 11 with the exception that an interaxle differential 640 is now operably installed between carrier 608 of front differential 38' and transfer shaft 614. In particular, input gear 606 is fixed for rotation with a carrier 642 of interaxle differential 640 from which pinion gears 644 are rotatably supported. A first side gear 646 is meshed with pinion gears 644 and is fixed for rotation with drive shaft 630 so as to be drivingly interconnected to the rear driveline through power transfer unit 35. Likewise, a second side gear 648 is meshed with pinion gears 644 and is fixed for rotation with carrier 608 of front differential 38' so as to be drivingly interconnected to the front driveline. In operation, when sensor 54 detects a vehicle operating condition, such as excessive interaxle slip, controller 58 adaptively controls activation of the piston associated with mode actuator 628 of the hydraulic clutch actuation system for controlling engagement of clutch assembly 618 and thus the torque biasing between the front and rear drivelines.

Figure 13:
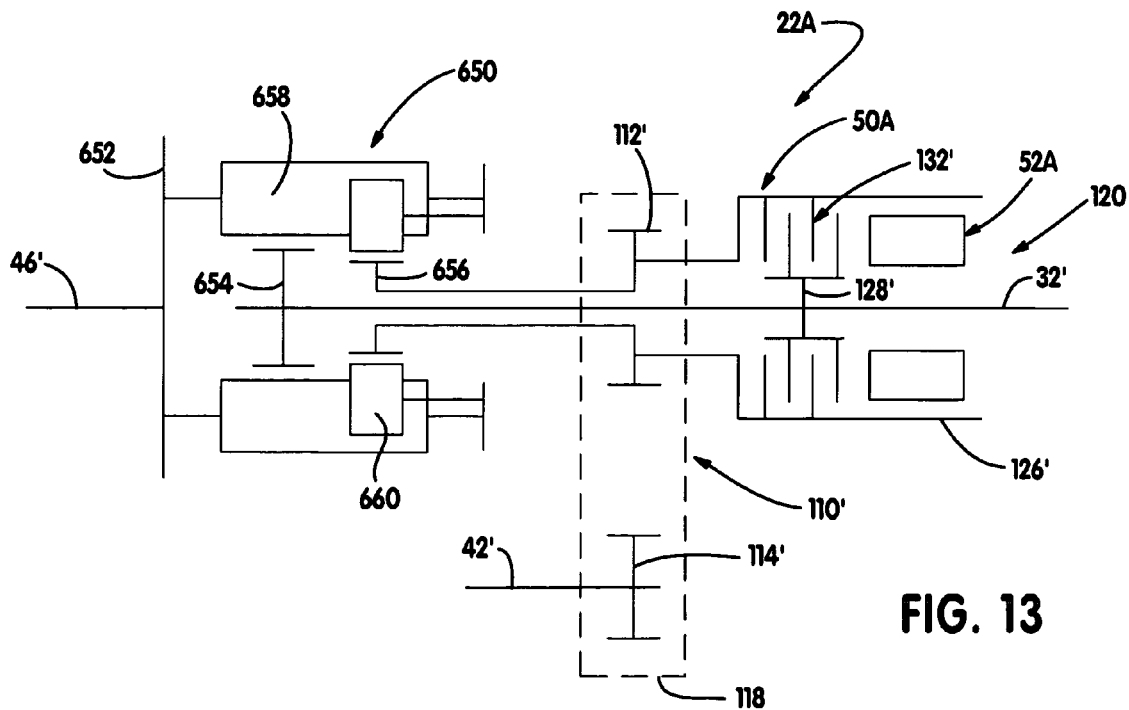

Referring now to FIG. 13, a full-time 4WD system is shown to include a transfer case 22A equipped with an interaxle differential 650 between an input shaft 46' and output shafts 32' and 42'. Differential 650 includes an input defined as a planet carrier 652, a first output defined as a first sun gear 654, a second output defined as a second sun gear 656, and a gearset for permitting speed differentiation between first and second sun gears 654 and 656. The gearset includes meshed pairs of first planet gears 658 and second pinions 660 which are rotatably supported by carrier 652. First planet gears 658 are shown to mesh with first sun gear 654 while second pinions 660 are meshed with second sun gear 656. First sun gear 654 is fixed for rotation with rear output shaft 32' so as to transmit drive torque to rear driveline 12. To transmit drive torque to front driveline 14, second sun gear 656 is coupled to a transfer assembly 110' which includes a first sprocket 112' rotatably supported on rear output shaft 32', a second sprocket 114' fixed to front output shaft 42', and a power chain 118.

Transfer case 22A further includes a transfer clutch 50A and a clutch actuator 52A controlled by a suitable hydraulic clutch actuation system 120, 300. Transfer clutch 50A includes a drum 126' fixed for rotation with first sprocket 112', a hub 128' fixed for rotation with rear output shaft 32' and a multi-plate clutch pack 132' operably disposed therebetween. As described, hydraulic clutch actuation systems 120 and 300 include a mode actuator 52 having at least one piston that can be hydraulically engaged with clutch pack 132'.

Figure 14:
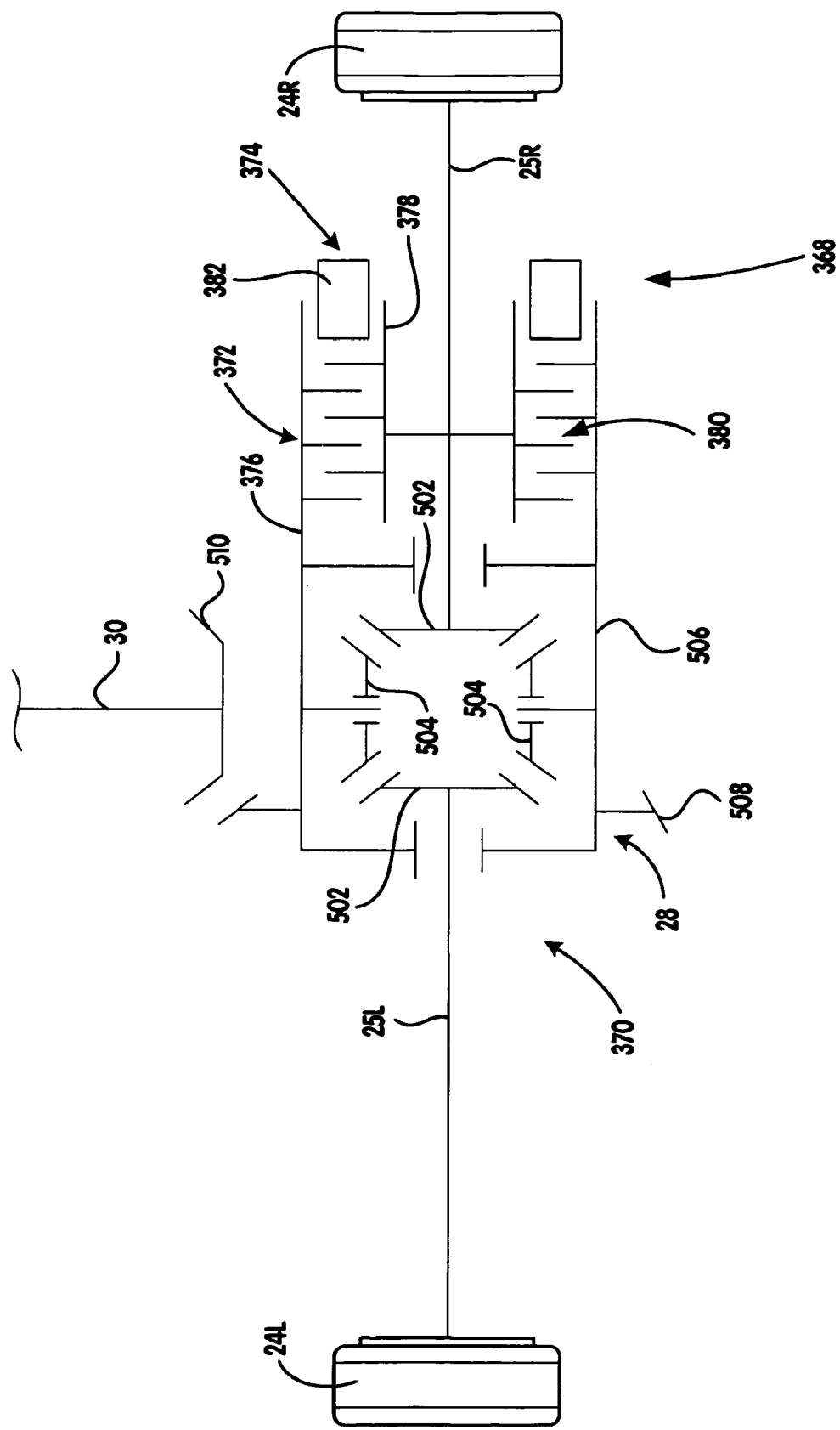

Referring now to FIG. 14, a drive axle assembly 370 is shown which is generally a modified version of rear axle assembly 26 and which incorporates a torque transfer mechanism in association with rear differential 28 so as to permit adaptive control of the torque biasing and intra-axle speed differentiation between rear wheels 24L, 24R. The torque transfer mechanism is a torque bias coupling 368 shown to include a multi-plate clutch assembly 372 that is operably disposed between differential carrier 506 and right axleshaft 25R and a clutch actuator 374. Clutch assembly 372 includes a drum 376 fixed for rotation with carrier 506, a hub 378 fixed for rotation with axleshaft 25R and a clutch pack 380 disposed therebetween. Clutch actuator 374 is operable for controlling the magnitude of a clutch engagement force applied to clutch pack 380 and thus, the torque biasing between left wheel 24L and right wheel 24R. Clutch actuator 374 is similar to the previously disclosed in that it functions to engage clutch pack 380 under the control of hydraulic clutch actuator system 120, 300.

Figure 15:
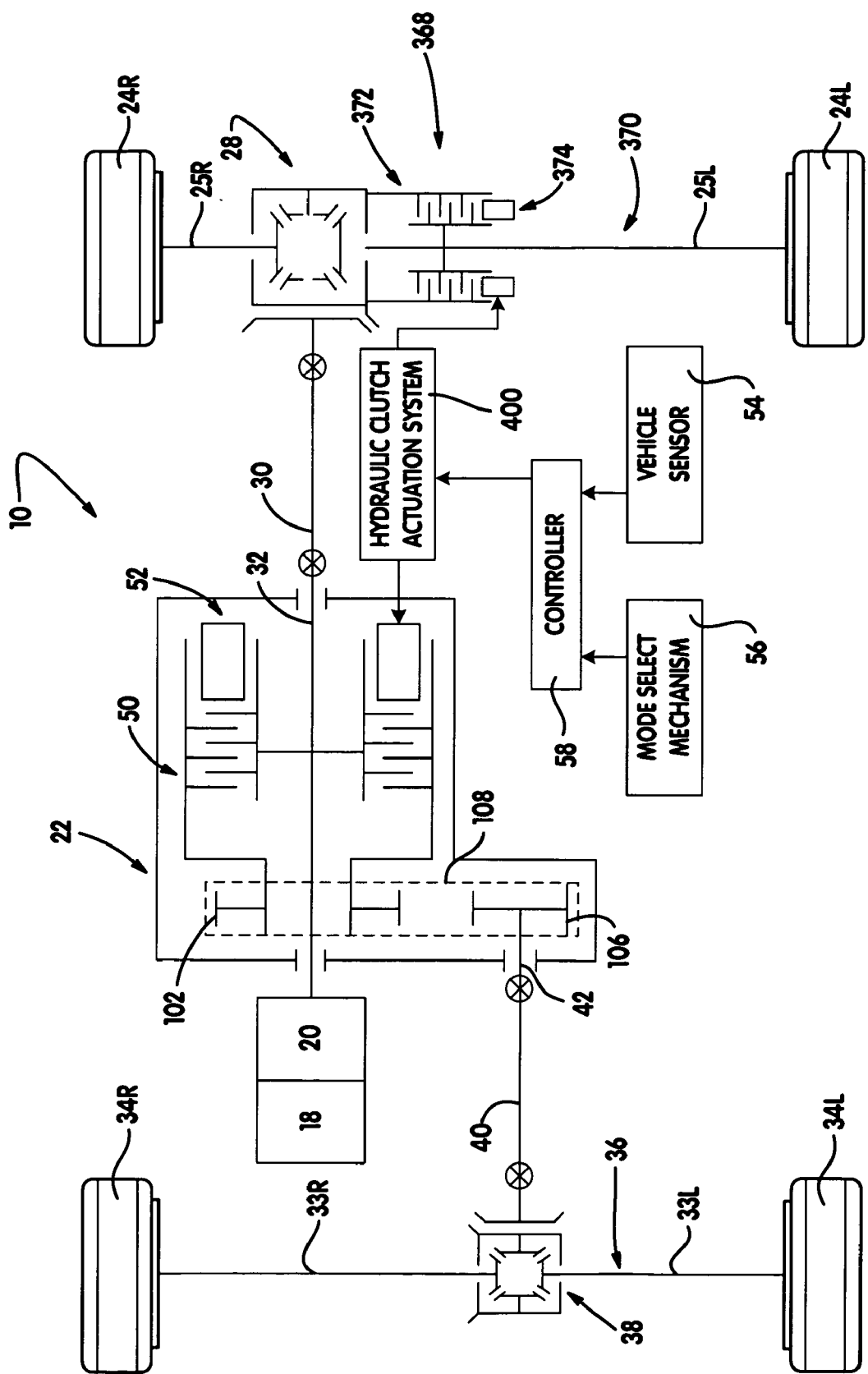
FIG. 15 illustrates the drivetrain of a four-wheel drive motor vehicle equipped with a transfer case and a limited-slip rear differential assembly each having a torque transfer mechanism controlled by a hydraulic clutch actuation system of the present invention.

Drive axle assembly 370 can be used alone or in combination with other torque transfer mechanisms disclosed herein. In particular, drive axle assembly 370 can be associated with the primary axle in a rear wheel based on-demand 4WD drivetrain, a front wheel based on-demand 4WD drivetrain or in either (or both) axles in full-time 4WD drivetrains. For example, FIG. 15 illustrates drivetrain 10 having drive axle assembly 370 used in conjunction with a single-speed on-demand version of transfer case 22, both of which having torque transfer mechanisms that are adaptively controlled utilizing hydraulic clutch actuation system 400 of FIG. 6. Thus, engagement of transfer clutches 50 and 372 are individually controlled using hydraulically-operated clutch actuators 52 and 374.

Figure 16:
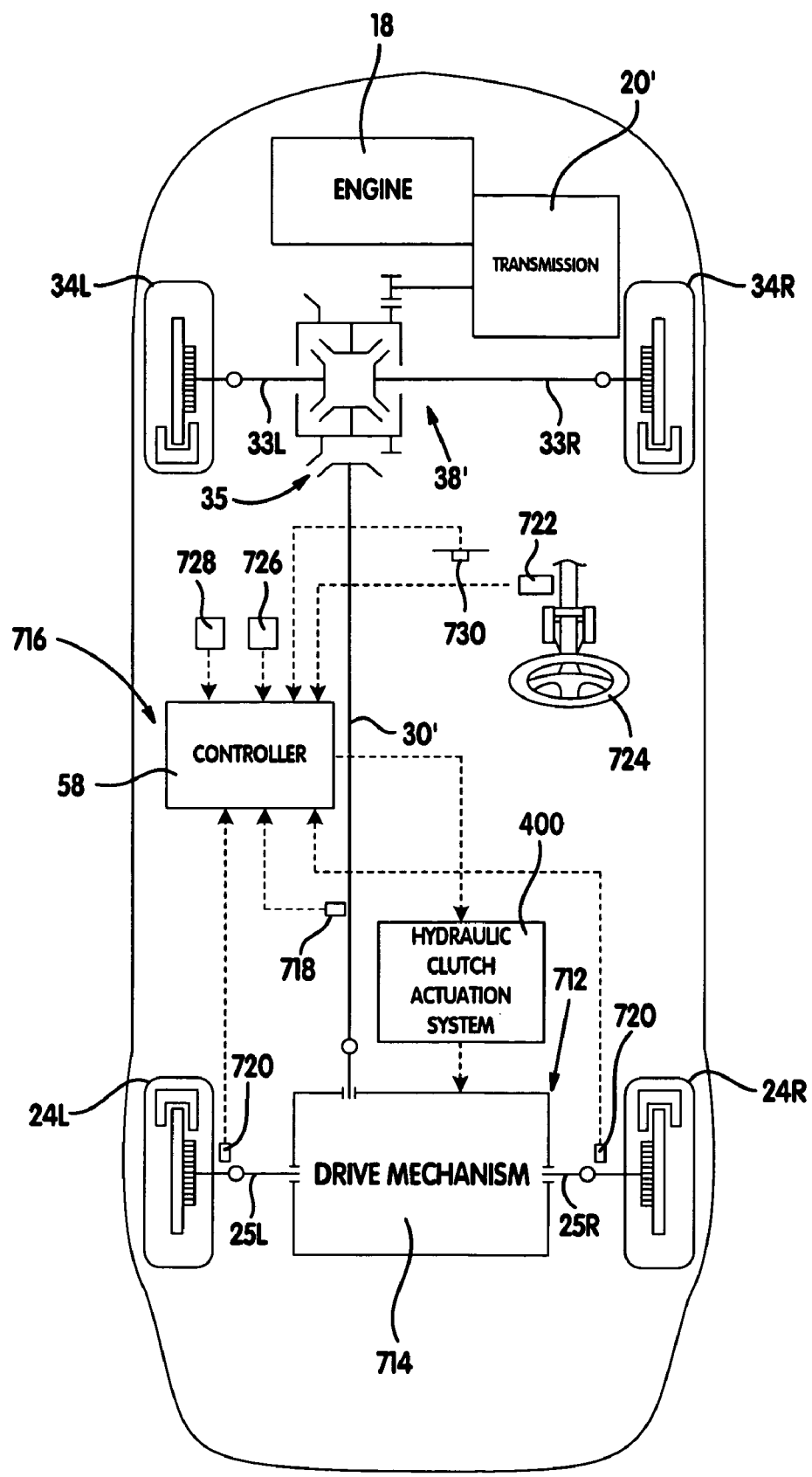
FIG. 16 is a diagrammatical illustration of an all-wheel drive motor vehicle equipped with a drive axle assembly having a torque distributing drive mechanism and active yaw control system.

Referring now to FIG. 16, an all-wheel drive vehicle is shown to include engine 18 transversely mounted in a front portion of a vehicle body, transmission 20', front differential 38' which connects the output of transmission 20' to front axleshafts 33L and 33R and left and right front wheels 34L and 34R, power transfer unit 35 which connects transmission 20' to propshaft 30' and a drive axle assembly 712. Drive axle assembly 712 has a torque distributing drive mechanism 714 which connects propshaft 30' to axleshafts 25L and 25R for driving rear wheels 24L and 24R. As will be detailed, drive mechanism 714 is operable in association with a yaw control system 716 and hydraulic clutch actuation system 400 for controlling the transmission of drive torque through axleshaft 25L and 25R to rear wheels 24L and 24R.

In addition to controller 58, yaw control system 716 includes a plurality of sensors for detecting various operational and dynamic characteristics of the vehicle. For example, a front wheel speed sensor 718 is provided for detecting an average front wheel speed value based on rotation of propshaft 30', a pair of rear wheel speed sensors 720 are operable to detect the individual rear wheel speed values based rotation of left and right axleshafts 25L and 25R, and a steering angle sensor 722 is provided to detect the steering angle of a steering wheel 724. The sensors also include a yaw rate sensor 726 for detecting a yaw rate of the body portion of the vehicle, a lateral acceleration sensor 728 for detecting a lateral acceleration of the vehicle body and a lock switch 730 for permitting the vehicle operator to intentionally shift drive mechanism 714 into a locked mode. As will be detailed, controller 58 controls operation of hydraulic clutch actuation system 400 for actuating a pair of torque transfer mechanisms within drive mechanism 714 by utilizing a control strategy that is based on input signals from the various sensors and lock switch 730.

Figure 17:
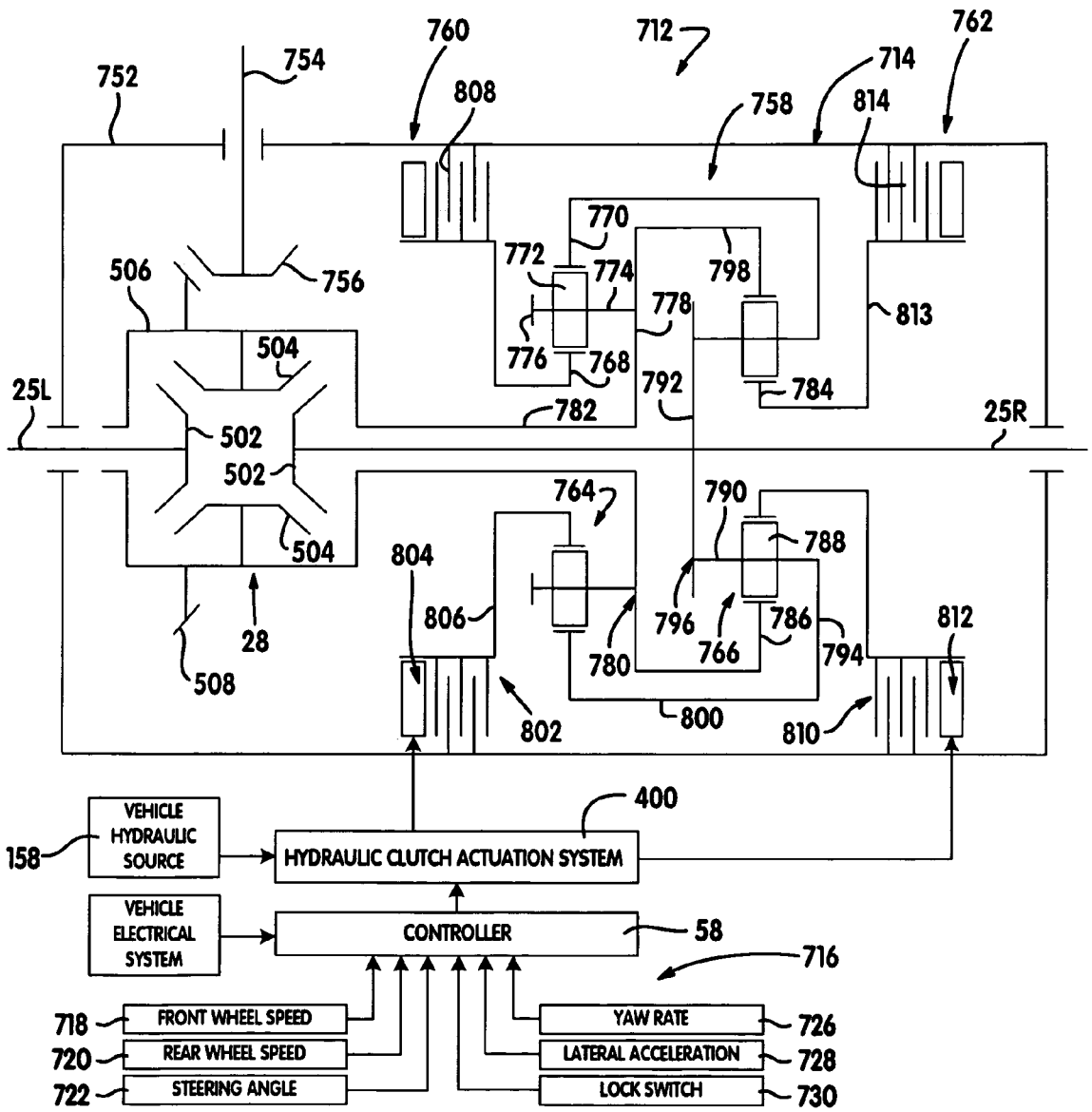
FIG. 17 is a schematic illustration of the torque distributing drive mechanism according to a first embodiment of the present invention.

As seen in FIG. 17, rear drive axle assembly 712 includes an axle housing 752 within which drive mechanism 714 is supported. In general, drive mechanism 714 includes an input pinion shaft 754, rear differential 28, a planetary gear assembly 758, a first or "overdrive" torque transfer mechanism 760 and a second or "underdrive" torque transfer mechanism 762. As seen, input shaft 754 has a pinion gear 756 driving ring gear 508 of rear differential 28. Planetary gear assembly 758 includes a first gearset 764 and a second gearset 766. First gearset 764 includes a first sun gear 768, a first ring gear 770 and a set of first planet gears 772 meshed with first sun gear 768 and first ring gear 770. Each of first planet gears 772 is rotatably supported on a post 774 extending between first and second carrier rings 776 and 778, respectively, that in combination define a first planet carrier 780. A quill shaft 782 is coaxially disposed between right axleshaft 25R and first sun gear 768 and is shown to connect second carrier ring 778 for rotation with differential carrier 506. As such, first planet carrier 780 is the input member of first gearset 764 since it is commonly driven with differential carrier 506.

Second gearset 766 includes a second sun gear 784, a second ring gear 786 and a set of second planet gears 788 meshed therewith. Second planet gears 788 are rotatably supported on posts 790 extending between third and fourth carrier rings 792 and 794, respectively, that in combination define a second planet carrier 796. As seen, second ring gear 786 is coupled via a first drum 798 to second carrier ring 778 for common rotation with first planet carrier 780. In addition, third carrier ring 792 is fixed for rotation with right axleshaft 25R while fourth carrier ring 794 is fixed via a second drum 800 for common rotation with first ring gear 770.

With continued reference to FIG. 17, first torque transfer mechanism 760 is shown to be operatively disposed between first sun gear 768 and axle housing 752 such that it is operable to selectively brake rotation of first sun gear 768. First torque transfer mechanism 760 is schematically shown to include a first multi-plate clutch assembly 802 and a first hydraulically-operated clutch actuator 804. Clutch assembly 802 includes a clutch hub 806 fixed for rotation with first sun gear 768 and a multi-plate clutch pack 808 disposed between hub 806 and housing 752. Preferably, clutch actuator 804 is generally similar in structure and function to clutch actuator 401 associated with hydraulic clutch actuation system 400 of FIG. 6.

First torque transfer mechanism 760 is operable in a first or "released" mode so as to permit unrestricted rotation of first sun gear 768 relative to housing 752. In contrast, first torque transfer mechanism 760 is also operable in a second or "locked" mode for inhibiting rotation of first sun gear 768. With first sun gear 768 braked, the rotary speed of first ring gear 770 is increased which results in a corresponding increase in the rotary speed of right axleshaft 25R due to its direct connection with first ring gear 770 via second drum 800 and second planet carrier 796. Thus, right axleshaft 25R is overdriven is at a speed ratio established by the meshed gear components of first gearset 764. First torque transfer mechanism 760 is shifted between its released and locked modes via actuation of first clutch actuator 804 in response to control signals sent to hydraulic clutch actuation system 400 from controller 58. Specifically, first torque transfer mechanism 760 is operable in its released mode when first clutch actuator 804 applies a predetermined minimum cutch engagement force on clutch pack 808 and is further operable in its locked mode when first clutch actuator 804 applies a predetermined maximum clutch engagement force on clutch pack 808.

Second torque transfer mechanism 762 is shown to be operably arranged between second sun gear 784 and housing 752. Second torque transfer mechanism 762 is schematically shown to include a second multi-plate clutch assembly 810 and a second hydraulically-operated clutch actuator 812. Clutch assembly 810 includes a clutch hub 813 fixed for rotation with second sun gear 784 and a clutch pack 814 disposed between hub 813 and housing 752. As will be appreciated, second clutch actuator 812 is similar to that of second clutch actuator 405 (see FIG. 6) for controlling movement of a piston relative to clutch pack 814. Second torque transfer mechanism 762 is operable in a first or "released" mode to permit unrestricted rotation of second sun gear 784. In contrast, second torque transfer mechanism 762 is also operable in a second or "locked" mode for inhibiting rotation of second sun gear 784. With second sun gear 784 braked, the rotary speed of second planet carrier 796 is reduced which results in a corresponding speed reduction in right axleshaft 25R. Thus, right axleshaft 25R is underdriven at a speed ratio determined by the gear geometry of the meshed components of second gearset 766. Second torque transfer mechanism 762 is shifted between its released and locked modes via actuation of clutch actuator 812 by hydraulic clutch actuation system 400 in response to control signals from controller 58. In particular, second torque transfer mechanism 762 operates in its released mode when clutch actuator 812 applies a predetermined minimum clutch engagement force on clutch pack 814 while it operates in its locked mode when clutch actuator 812 applies a predetermined maximum clutch engagement force on cutch pack 814.

In accordance with the arrangement shown, drive mechanism 714 is operable in coordination with yaw control system 716 to potentially establish at least four distinct operational modes for controlling the transfer of drive torque from input shaft 754 to axleshafts 25L and 25R. In particular, a first operational mode can be established when first torque transfer mechanism 760 and second torque transfer mechanism 762 are both in their released mode such that rear differential 28 acts as an "open" differential so as to permit unrestricted speed differentiation with drive torque transmitted from differential carrier 506 to axleshafts 25L and 25R based on the tractive conditions at each corresponding rear wheels 24L and 24R. A second operational mode can be established when both first torque transfer mechanism 760 and second torque transfer mechanism 762 are in their locked mode such that rear differential 28 acts as a "locked" differential with no speed differentiation permitted between rear axleshafts 25L and 25R. This mode can be intentionally selected via actuation of lock switch 730 when the vehicle is being operated off-road or on poor roads.

A third operational mode can be established when first torque transfer mechanism 760 is shifted into its locked mode while second torque transfer mechanism 762 is operable in its released mode. With first sun gear 768 held against rotation, rotation of first planet carrier 780 due to driven rotation of differential carrier 506 causes first ring gear 770 to be driven at an increased speed relative to differential carrier 506. As a result, right axleshaft 25R is overdriven at the same increased speed of first ring gear 770 due to its connection thereto via second drum 800 and second planet carrier 796. Such an increase in speed in right axleshaft 25R causes a corresponding speed reduction in left axleshaft 25L. Thus, left axleshaft 25L is underdriven while right axleshaft 25R is overdriven to accommodate the current tractive or steering condition detected and/or anticipated by controller 58 based on the particular control strategy used.

A fourth operational mode can be established when first torque transfer mechanism 760 is shifted into its released mode and second torque transfer mechanism 762 is shifted into its locked mode. With second sun gear 784 held against rotation and second ring gear 786 driven at a common speed with differential carrier 506, second planet carrier 796 is driven at a reduced speed. As a result, right rear axleshaft 25R is underdriven relative to differential carrier 506 which, in turn, causes left axleshaft 25L to be overdriven at a corresponding increased speed. Thus, left axleshaft 25L is overdriven while right axleshaft 25R is underdriven to accommodate the current tractive or steering conditions detected and/or anticipated by controller 58.

In addition to on-off control of the torque couplings to establish the various drive modes associated with overdrive and underdrive connections through speed changing unit 758, it is further contemplated that variable clutch engagement forces can be generated by hydraulically-operated clutch actuators 804 and 812 to adaptively regulate the left-to-right speed and torque characteristics. This "adaptive" control feature functions to provide enhanced yaw and stability control for the vehicle. For example, a reference yaw rate can be determined based on several factors including the steering angle detected by steering angle sensor 722, the vehicle speed as calculated based on signals from the various speed sensors, and a lateral acceleration as detected by lateral acceleration sensor 728. Controller 58 compares this reference yaw rate with an actual yaw rate value detected by yaw sensor 726. This comparison will determine whether the vehicle is in an understeer or an oversteer condition so as to permit yaw control system 716 to be adaptively control actuation of the couplings to accommodate these types of steering tendencies. Controller 58 can address such conditions by shifting drive mechanism 714 into the specific operative drive mode that is best suited to correct the actual or anticipated oversteer or understeer situation. Optionally, variable control of the torque transfer mechanisms also permits adaptive regulation of the side-to-side torque transfer and speed differentiation characteristics if one of the distinct drive modes is not adequate to accommodate the current steer tractive condition.

Figure 18:
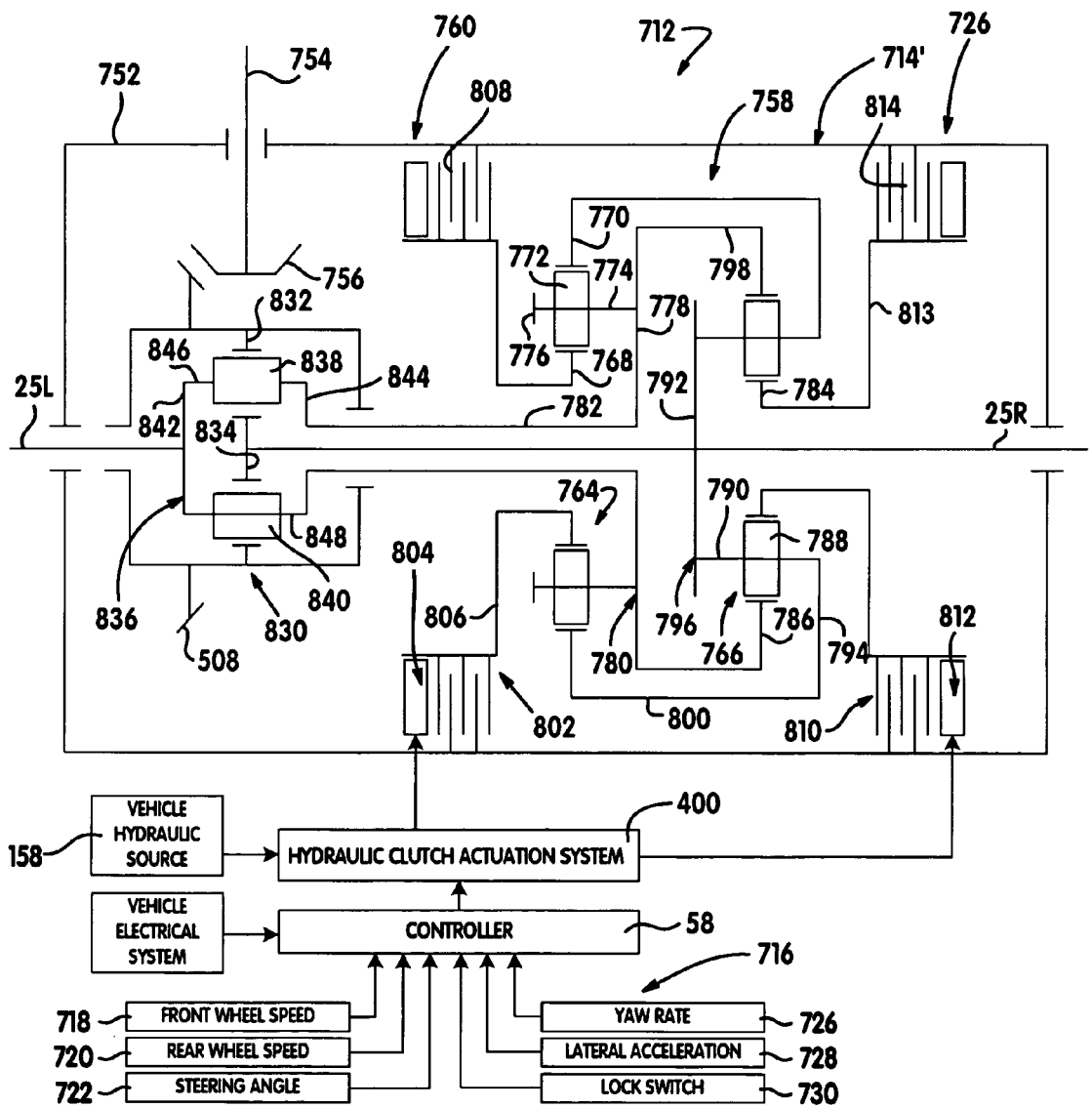
FIG. 18 is a schematic illustration of a second embodiment of the torque distributing drive mechanism of the present invention.

Referring now to FIG. 18, an alternative embodiment of drive mechanism 714 is shown and designated by reference numeral 714'. Generally speaking, a large number of components are common to both drive mechanism 714 and 714', with such components being identified by the same reference numbers. However, drive mechanism 714' is shown to include a rear differential 830 of the planetary type having a ring gear 832 driven by hypoid ring gear 508 so as to act as its input component. Differential 830 further includes a sun gear 834 fixed for common rotation with right axleshaft 25R, a differential carrier 836 fixed for common rotation with left axleshaft 25L and meshed sets of first pinions 838 and second pinions 840. Planet carrier 836 includes a first carrier ring 842 fixed to left axleshaft 25L, a second carrier ring 844 fixed to quill shaft 782, a set of first pins 846 extending between the carrier rings and on which first pinions 838 are rotatably supported and a set of second pins 848 that also extend between the carrier rings and rotatably support second pinions 840. First pinions 838 are meshed with sun gear 834 while second pinions 840 are meshed with ring gear 832. As seen, quill shaft 782 connects differential carrier 836 for common rotation with planet carrier 780 of first gearset 764.

Drive mechanism 714' is similar in operation to drive mechanism 714 in that first torque transfer mechanism 760 functions to cause right axleshaft 25R to be overdriven while second transfer mechanism 762 functions to cause right axleshaft 25R to be underdriven. As such, the four distinct operational modes previously described are again available and can be established by drive mechanism 714' via selective actuation of hydraulically-operated clutch actuators 804 and 812.

Figure 19:
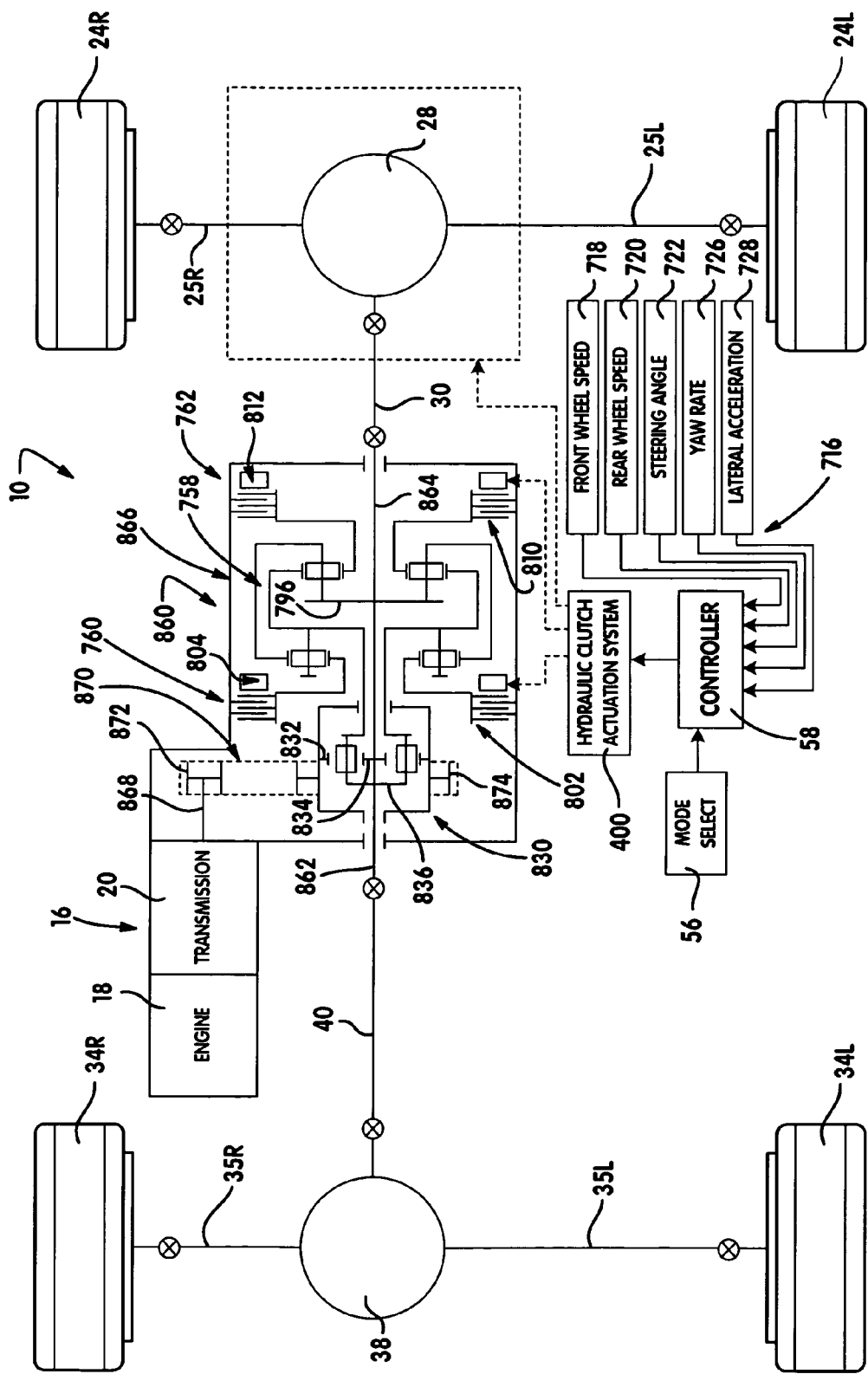
FIG. 19 is an illustration of the torque distributing drive mechanism of FIG. 10 now installed in a transfer case for use in four-wheel drive vehicles.

Referring now to FIG. 19, four-wheel drive vehicle 10 is shown with a power transfer unit 860 operable for transferring drive torque from the output of transmission 20 to a first or front output shaft 862 and a second or rear output shaft 864. Front output shaft 862 drives front propshaft 40 which, in turn, drives front differential 38 for driving front wheels 34L and 34R. Likewise, rear output shaft 864 drives rear propshaft 30 which, in turn, drives rear differential 28 for driving rear wheels 24L and 24R. Power transfer unit 860, otherwise known as a transfer case, includes a torque distribution mechanism 866 which functions to transmit drive torque from its input shaft 868 to both of output shafts 862 and 864 so as to bias the torque distribution ratio therebetween, thereby controlling the tractive operation of vehicle 10. As seen, torque distribution mechanism 866 is operably associated with traction control system 716 for providing this adaptive traction control feature.

Torque distribution mechanism 866 of power transfer unit 860 is shown to be generally similar in structure to drive mechanism 714' of FIG. 18 with the exception that ring gear 832 is now drivingly connected to input shaft 868 via a transfer assembly 870. In the arrangement shown, transfer assembly 870 includes a first sprocket 872 driven by input shaft 868, a second sprocket 874 driving ring gear 832 and a power chain 876 therebetween. As seen, front output shaft 862 is driven by differential carrier 836 of differential unit 830 which now acts as a center or "interaxle" differential for permitting speed differentiation between the front and rear output shafts. In addition, sun gear 834 of differential unit 830 drives rear output shaft 864. Also, planet carrier 796 of second gearset 766 is coupled to rear output shaft 864.

Control over actuation of first and second torque transfer mechanisms 760 and 762 in transfer case 860 results in corresponding increases or decreases in the rotary speed of rear output shaft 864 relative to front output shaft 862, thereby controlling the amount of drive torque transmitted therebetween. In particular, with both torque transfer mechanisms released, unrestricted speed differentiation is permitted between the output shafts while the gear ratio established by the components of interaxle differential unit 830 controls the front-to-rear torque ratio based on the current tractive conditions of the front and rear wheels. In contrast, with both torque transfer mechanisms engaged, a locked four-wheel drive mode is established wherein no interaxle speed differentiation is permitted between the front and rear output shafts. Such a drive mode can be intentionally selected via mode switch 56 when vehicle 10 is driven off-road or during severe road conditions. An adaptive four-wheel drive mode is made available under control of traction control system 716 to vary the front-rear drive torque distribution ratio based on the tractive needs of the front and rear wheels as detected by the various sensors. In addition to power transfer unit 860, vehicle 10 could also be equipped with rear, limited slip rear axle assembly 280 of FIG. 5 or torque vectoring drive axle assembly 716 of FIG. 9 or 10. This arrangement is shown by the phantom line box and the output from hydraulic clutch actuation system 400 used to control actuation of the additional torque transfer mechanisms.

Figure 20:
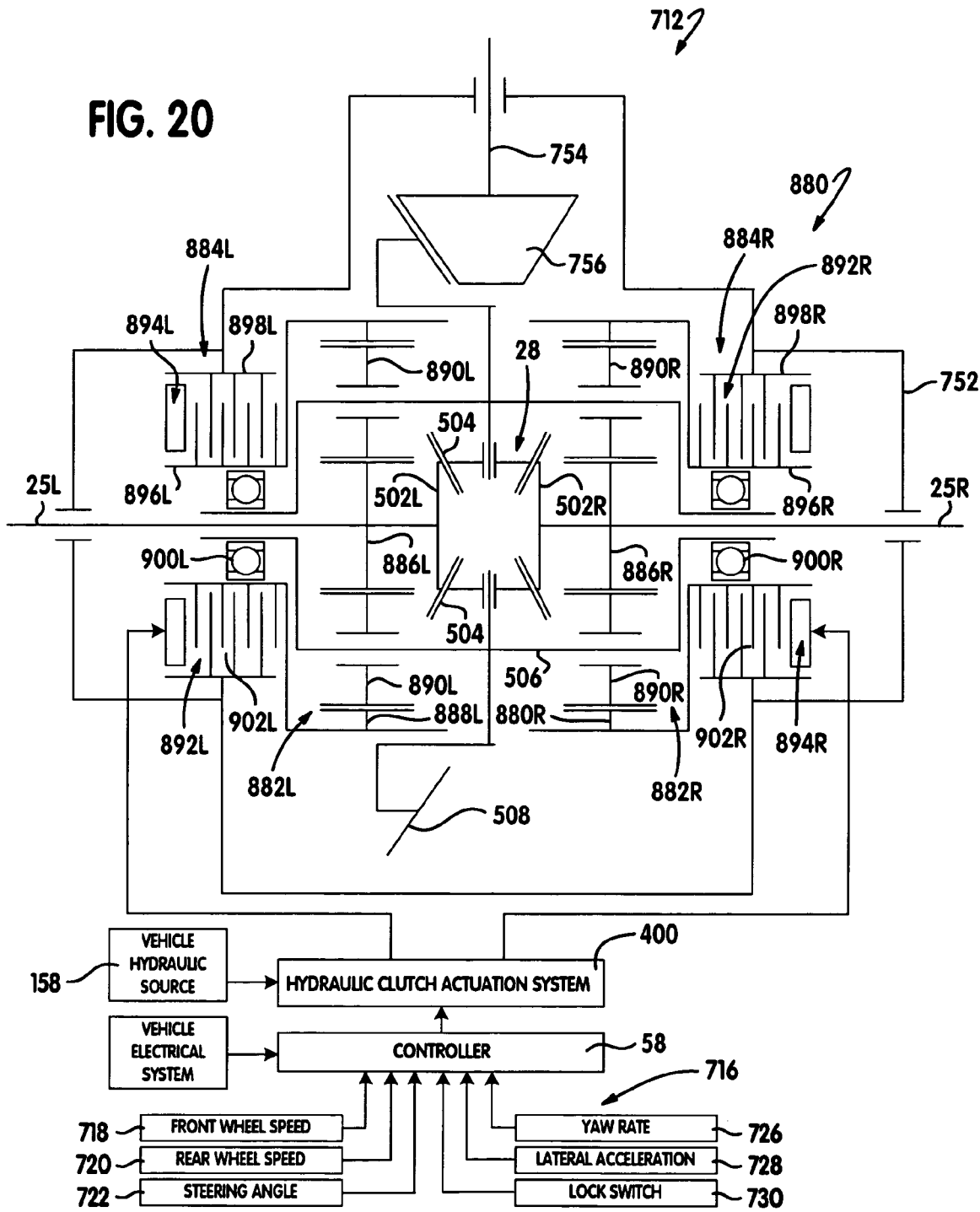
FIGS. 20 through 25 are schematic illustrations of additional alternative embodiments of the torque distributing drive mechanism of the present invention.

Referring now to FIG. 20, another embodiment of a drive mechanism 880 for use in drive axle assembly 712 is disclosed. In general, torque distributing drive mechanism 880 includes input shaft 754, differential 28, a first or left speed changing unit 882L, a second or right speed changing unit 882R, a first or left torque transfer mechanism 884L and a second or right torque transfer mechanism 884R. As before, input shaft 754 includes a pinion gear 756 that is in constant mesh with a hypoid ring gear 508. Ring gear 508 is fixed for rotation with carrier 506 associated with differential 28. Differential 28 is operable to transfer drive torque from carrier 506 to axleshafts 25L and 25R while permitting speed differentiation therebetween. Differential 28 includes a left side gear 502L fixed for rotation with left axleshaft 25L, a right side gear 502R fixed for rotation with right axleshaft 25R, and at least one pair of pinion gears 504 rotatably supported on pinion shafts that are fixed for rotation with carrier 506.

Left speed changing unit 882L is a planetary gearset having a sun gear 886L fixed for rotation with left axleshaft 25L, a ring gear 888L, and a plurality of planet gears 890L rotatably supported by carrier 506 and which are meshed with both sun gear 886L and ring gear 888L. Right speed changing unit 882R is generally identical to left speed changing unit 882L and is shown to include a sun gear 886R fixed for rotation with right axleshaft 25R, a ring gear 888R, and a plurality of planet gears 890R rotatably supported by carrier 506 and meshed with both sun gear 886R and ring gear 888R.

With continued reference to FIG. 20, first torque transfer mechanism 884L is shown to be operably disposed between ring gear 888L of first speed changing unit 882L and housing 752. First torque transfer mechanism 884L includes a first multi-plate clutch assembly 892L and a first clutch actuator 894L. Clutch assembly 892L includes a clutch hub 896L that is connected for common rotation with ring gear 888L and a drum 898L that is non-rotatably fixed to housing 752. As seen, a bearing assembly 900L supports hub 896L for rotation relative to carrier 506. In addition, a multi-plate clutch pack 902L is operably disposed between drum 898L and hub 896L.

First torque transfer mechanism 884L is operable in a first or "released" mode so as to permit unrestricted rotation of ring gear 888L. In contrast, first torque transfer mechanism 884L is also operable in a second or "locked" mode to brake rotation of ring gear 888L, thereby causing sun gear 886L to be driven at an increased rotary speed relative to carrier 506. Thus, first torque transfer mechanism 884L functions in its locked mode to increase the rotary speed of left axleshaft 25L which, in turn, causes differential 28 to generate a corresponding decrease in the rotary speed of right axleshaft 25R, thereby directing more drive torque to left axleshaft 25L than is transmitted to right axleshaft 25R. Specifically, an increase in the rotary speed of left axleshaft 25L caused by speed changing gearset 882L causes a corresponding increase in the rotary speed of first side gear 502L which, in turn, causes pinions 504 to drive right side gear 502R at a corresponding reduced speed. First torque transfer mechanism 884L is shifted between its released and locked modes via actuation of hydraulically-operated clutch actuator 894L by hydraulic actuation system 400 in response to control signals from controller 58.

Second torque transfer mechanism 884L is shown to be operably disposed between ring gear 888R of second speed changing unit 882R and housing 752. Second torque transfer mechanism 884R includes a second multi-plate clutch assembly 892R and a second clutch actuator 894R. In particular, clutch assembly 892R includes a clutch hub 896R that is fixed for rotation with ring gear 888R, a drum 898R non-rotatably fixed to housing 752, and a multi-plate clutch pack 902R operably disposed between hub 896R and drum 898R. Second torque transfer mechanism 884R is operable in a first or "released" mode so as to permit unrestricted relative rotation of ring gear 888R. In contrast, second torque coupling 884R is also operable in a second or "locked" mode to brake rotation of ring gear 888R, thereby causing the rotary speed of sun gear 8586R to be increased relative to carrier 506. Thus, second torque transfer mechanism 884R functions in its locked mode to increase the rotary speed of right axleshaft 25R which, in turn, causes differential 28 to decrease the rotary speed of left axleshaft 25L, thereby directing more drive torque to right axleshaft 25R than is directed to left axleshaft 25L. Second torque transfer mechanism 884R is shifted between its released and locked modes via actuation of clutch actuator 894R in response to control signals delivered to hydraulic clutch actuation system 400 from ECU 58.

In accordance with the arrangement shown, torque distributing drive mechanism 880 is operable in coordination with yaw control system 716 to establish at a least three distinct operational modes for controlling the transfer of drive torque from input shaft 754 to axleshafts 25L and 25R. In particular, a first operational mode is established when first torque transfer mechanism 884L and second torque transfer mechanism 884R are both in their released mode such that differential 28 acts as an "open" differential so as to permit unrestricted speed differentiation with drive torque transmitted from carrier 506 to each axleshaft 25L and 25R based on the tractive conditions at each corresponding rear wheel 24L and 24R. A second operational mode is established when first torque transfer mechanism 884L is in its locked mode while second torque transfer mechanism 884R is in its released mode. As a result, left axleshaft 25L is overdriven by first speed changing unit 882L due to the braking of ring gear 888L. As noted, such an increase in the rotary speed of left axleshaft 25L causes a corresponding speed decrease in right axleshaft 25R. Thus, this second operational mode causes right axleshaft 25R to be underdriven while left axleshaft 25L is overdriven when such an unequal torque distribution is required to accommodate the current tractive or steering condition detected and/or anticipated by controller 58 and based on the particular control strategy used. A third operational mode is established when first torque transfer 884L is shifted into its released mode and second torque transfer 884R is shifted into its locked mode. As a result, right axleshaft 25R is overdriven relative to carrier 506 by second speed changing unit 882R which, in turn, causes left axleshaft 25L to be underdriven by differential 28 at a corresponding reduced speed. Accordingly, drive mechanism 880 can be controlled to function as both a limited slip differential and a torque vectoring device.

Figure 21:
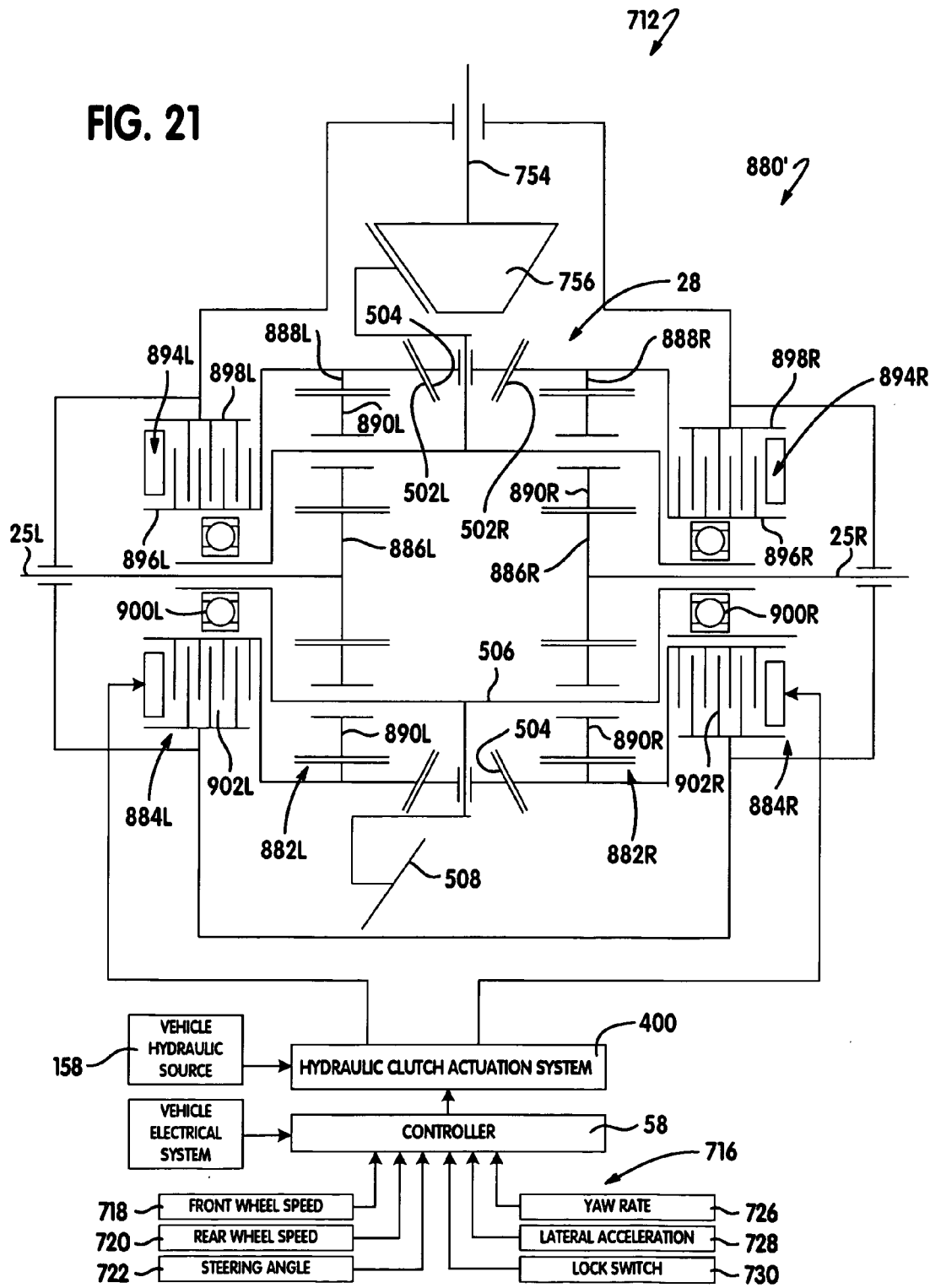

Referring now to FIG. 21, a modified version of drive mechanism 880 from FIG. 20 is shown and hereinafter referred to as drive mechanism 880'. Again, common components are identified with the same reference numerals. In this embodiment, however, differential 28 has been moved outboard of carrier 506 rather than the inboard arrangement shown in FIG. 20. To accomplish this, left side gear 502L is now shown to be fixed for rotation with ring gear 888L while right side gear 502R is shown to be fixed for rotation with ring gear 888R. Pinions 504 are still rotatably mounted on pinion shafts that couple ring gear 508 to carrier 506. Drive mechanism 880' also works in conjunction with yaw control system 716 to establish the three distinct operational modes. As before, with both torque transfer mechanisms released, differential 28 acts as an open differential with side gears 502L and 502R driving corresponding ring gears 888L and 888R which, in turn, transfers drive torque to axleshafts 25L and 25R through speed changing gearsets 882L and 882R, respectively. Drive mechanism 880' is also operable when first torque transfer mechanism 884L is locked and second torque transfer mechanism 884R is released to have first gearset 882L overdrive left axleshaft 25L relative to carrier 506. Specifically, with ring gear 888L braked, left side gear 502L is likewise braked such that pinions 504 cause right side gear 502R to be rotated at an increased speed. This increased rotary speed of side gear 502R causes corresponding rotation of ring gear 888R which, in turn, causes sun gear 886R to drive right axleshaft 25R at a reduced speed. In contrast, when first torque transfer mechanism 884L is released and second torque transfer mechanism 884R is locked, second gearset 882R overdrives right axleshaft 25R due to braking of ring gear 888R. In addition, the concurrent braking of side gear 502R causes a corresponding increase in rotary speed of ring gear 888L so as to reduce the rotary speed of sun gear 886L and left axleshaft 25L.

Figure 22:
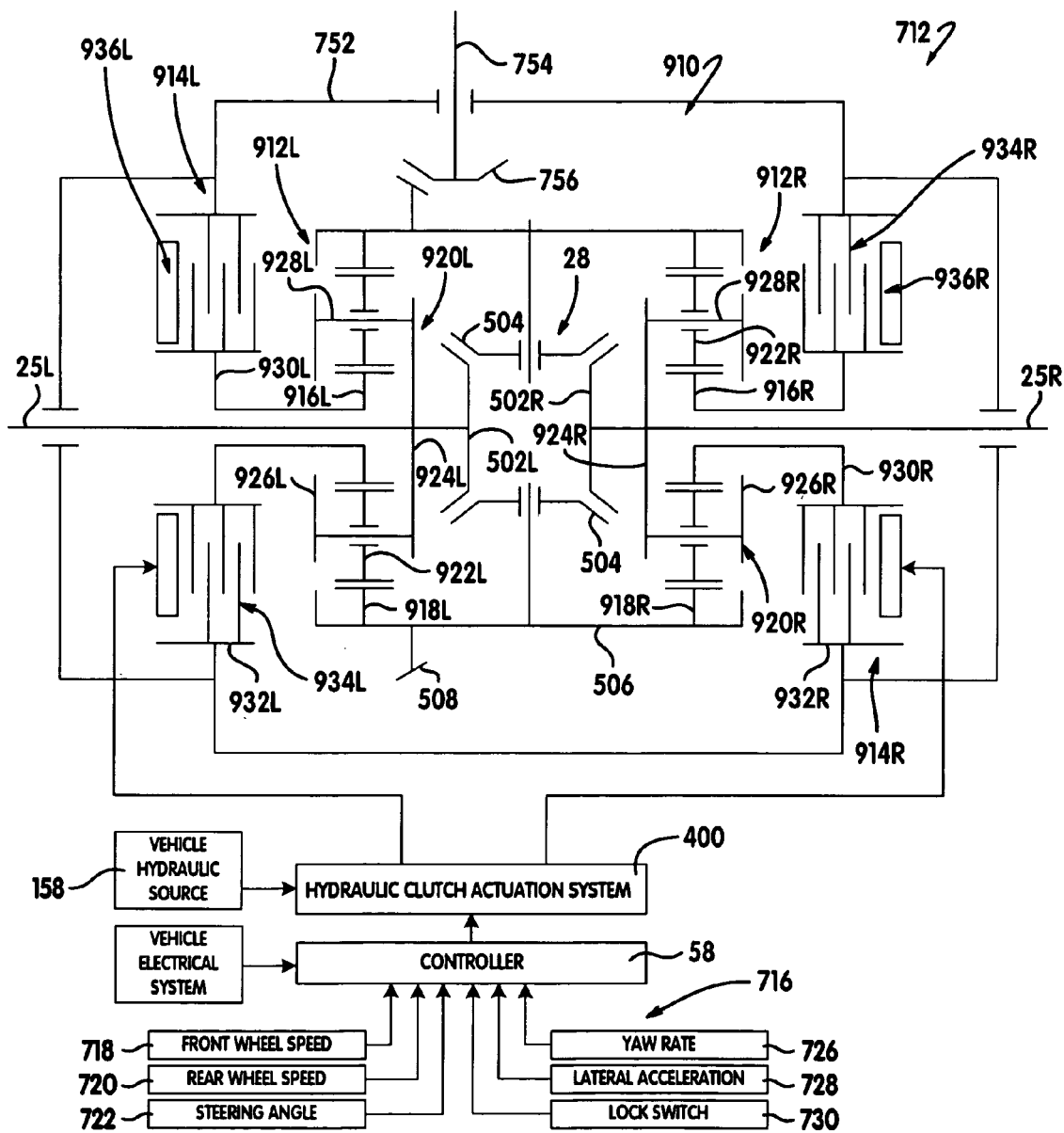

Referring now to FIG. 22, rear axle assembly 712 is shown to include a drive mechanism 910. In general, torque distributing drive mechanism 910 includes input shaft 754, differential 28, a first or left speed changing unit 912L, a second or right speed changing unit 912R, a first or left torque transfer mechanism 914L and a second or right torque transfer mechanism 914R. Left speed changing unit 912L is a planetary gearset having a sun gear 916L supported for rotation relative to left axleshaft 25L, a ring gear 918L fixed for rotation with differential carrier 506, a planet carrier 920L fixed for rotation with left axleshaft 25L, and a plurality of planet gears 922L rotatably supported on planet carrier 920L and which are meshed with both sun gear 916L and ring gear 918L. As seen, planet carrier 620L includes a first carrier ring 924L that is fixed to axleshaft 25L, a second carrier ring 926L and pins 928L therebetween on which planet gears 922L are rotatably supported. Right speed changing unit 912R is generally identical to left speed changing unit 912L and is shown to include a sun gear 916R supported for rotation relative to right axleshaft 25R, a ring gear 918R fixed for rotation with differential carrier 506, a planet carrier 920R fixed for rotation with right axleshaft 25R, and a plurality of planet gears 922R rotatably supported on planet carrier 920R and which are meshed with both sun gear 916R and ring gear 918R. Planet carrier 620R also includes a first carrier ring 924R that is fixed to axleshaft 25R, a second carrier ring 926R and pins 928R therebetween on which planet gears 922R are rotatably supported.

With continued reference to FIG. 22, first torque transfer mechanism 914L is shown to be operably disposed between sun gear 916L of first speed changing unit 912L and housing 752. In particular, first torque transfer mechanism 914L includes a clutch hub 930L that is connected for common rotation with sun gear 916L and a drum 932L that is non-rotatably fixed to housing 752. First torque transfer mechanism 914L also includes a first multi-plate clutch pack 934L that is operably disposed between drum 932L and hub 930L and a first hydraulically-operated clutch actuator 936L. First torque transfer mechanism 914L is operable in a first or "released" mode so as to permit unrestricted rotation of sun gear 916L. In contrast, first torque transfer mechanism 914L is also operable in a second or "locked" mode to brake rotation of sun gear 916L, thereby causing planet carrier 920L to be driven at a reduced rotary speed relative to differential carrier 506. Thus, first torque transfer mechanism 914L functions in its locked mode to decrease the rotary speed of left axleshaft 25L which, in turn, causes differential 28 to generate a corresponding increase in the rotary speed of right axleshaft 25R, thereby directing more drive torque to right axleshaft 25R than is transmitted to left axleshaft 25L. Specifically, the reduced rotary speed of left axleshaft 25L caused by engagement of speed changing gearset 912L causes a corresponding decrease in the rotary speed of left side gear 290L which, in turn, causes pinions 504 to drive right side gear 504R and right axleshaft 25R at a corresponding increased speed. First torque transfer mechanism 914L is shifted between its released and locked modes by actuation of clutch actuator 936L via clutch actuation system 400 in response to control signals from controller 58.

Second torque transfer mechanism 914R is shown to be operably disposed between sun gear 916R of second speed changing unit 912R and housing 752. In particular, second torque transfer mechanism 914R includes a clutch hub 930R that is fixed for rotation with sun gear 916R, a drum 932R non-rotatably fixed to housing 752, a second multi-plate clutch pack 934R operably disposed between hub 930R and drum 932R and second clutch actuator 936R. Second torque transfer mechanism 914R is operable in a first or "released" mode so as to permit unrestricted relative rotation of sun gear 916R. In contrast, second torque transfer mechanism 914R is also operable in a second or "locked" mode to brake rotation of sun gear 916R, thereby causing the rotary speed of planet carrier 920R to be decreased relative to differential carrier 506. Thus, second torque transfer mechanism 614R functions in its locked mode to decrease the rotary speed of right axleshaft 25R which, in turn, causes differential 28 to increase the rotary speed of left axleshaft 25L, thereby directing more drive torque to left axleshaft 25L than is directed to right axleshaft 25R. Second torque transfer mechanism 914R is shifted between its released and locked modes via actuation of hydraulically-operated clutch actuator 936R in response to control signals from controller 58.

In accordance with the arrangement shown, torque distributing drive mechanism 910 is operable in coordination with yaw control system 716 to establish at a least three distinct operational modes for controlling the transfer of drive torque from input shaft 754 to axleshafts 25L and 25R. In particular, a first operational mode is established when first torque transfer mechanism 914L and second torque transfer mechanism 914R are both in their released mode such that differential 28 acts as an "open". A second operational mode is established when first torque transfer mechanism 914L is in its locked mode while second torque transfer mechanism 914R is in its released mode. As a result, left axleshaft 25L is underdriven by first speed changing unit 912L due to braking of sun gear 916L. As noted, such a decrease in the rotary speed of left axleshaft 25L causes a corresponding speed increase in right axleshaft 25R. Thus, this second operational mode causes right axleshaft 25R to be overdriven while left axleshaft 25L is underdriven whenever such an unequal torque distribution is required to accommodate the current tractive or steering condition detected and/or anticipated by controller 58. Likewise, a third operational mode is established when first torque transfer mechanism 914L is shifted into its released mode and second torque transfer mechanism 914R is shifted into its locked mode. As a result, right axleshaft 25R is underdriven relative to differential carrier 506 by second speed changing unit 912R which, in turn, causes left axleshaft 25L to be overdriven at a corresponding increased speed. Accordingly, drive mechanism 910 can be controlled to function as both a limited slip differential and a torque vectoring device.

Figure 23:
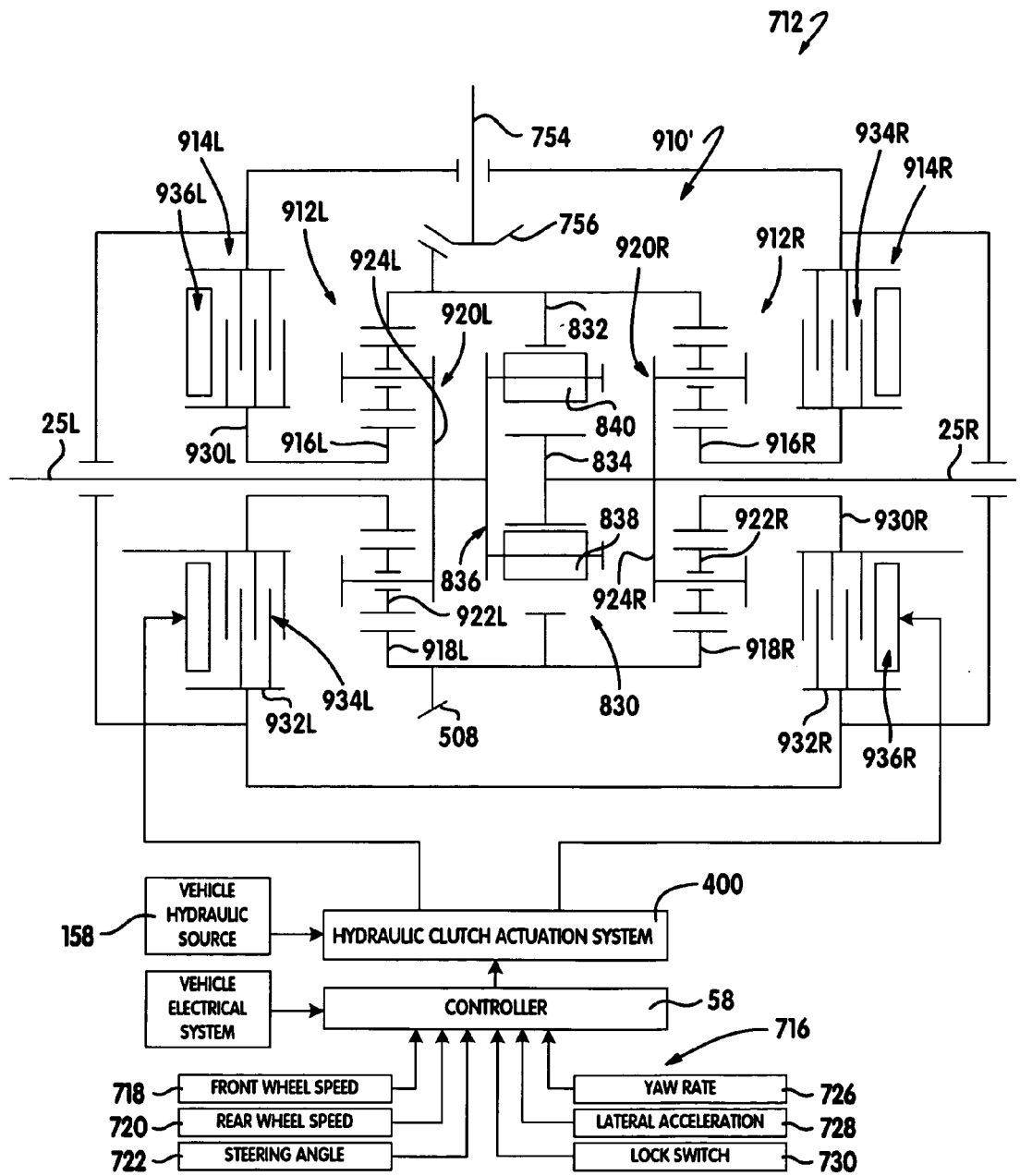

Referring now to FIG. 23, a modified version of drive mechanism 910 is shown and hereinafter referred to as drive mechanism 910'. Again, common reference numbers are used to identify similar components. In this embodiment, however, bevel differential 28 has been replaced with planetary differential 830. As such, planet carrier 836 is fixed to left axleshaft 25L while sun gear 834 is fixed to right axleshaft 25R.

Figure 24:
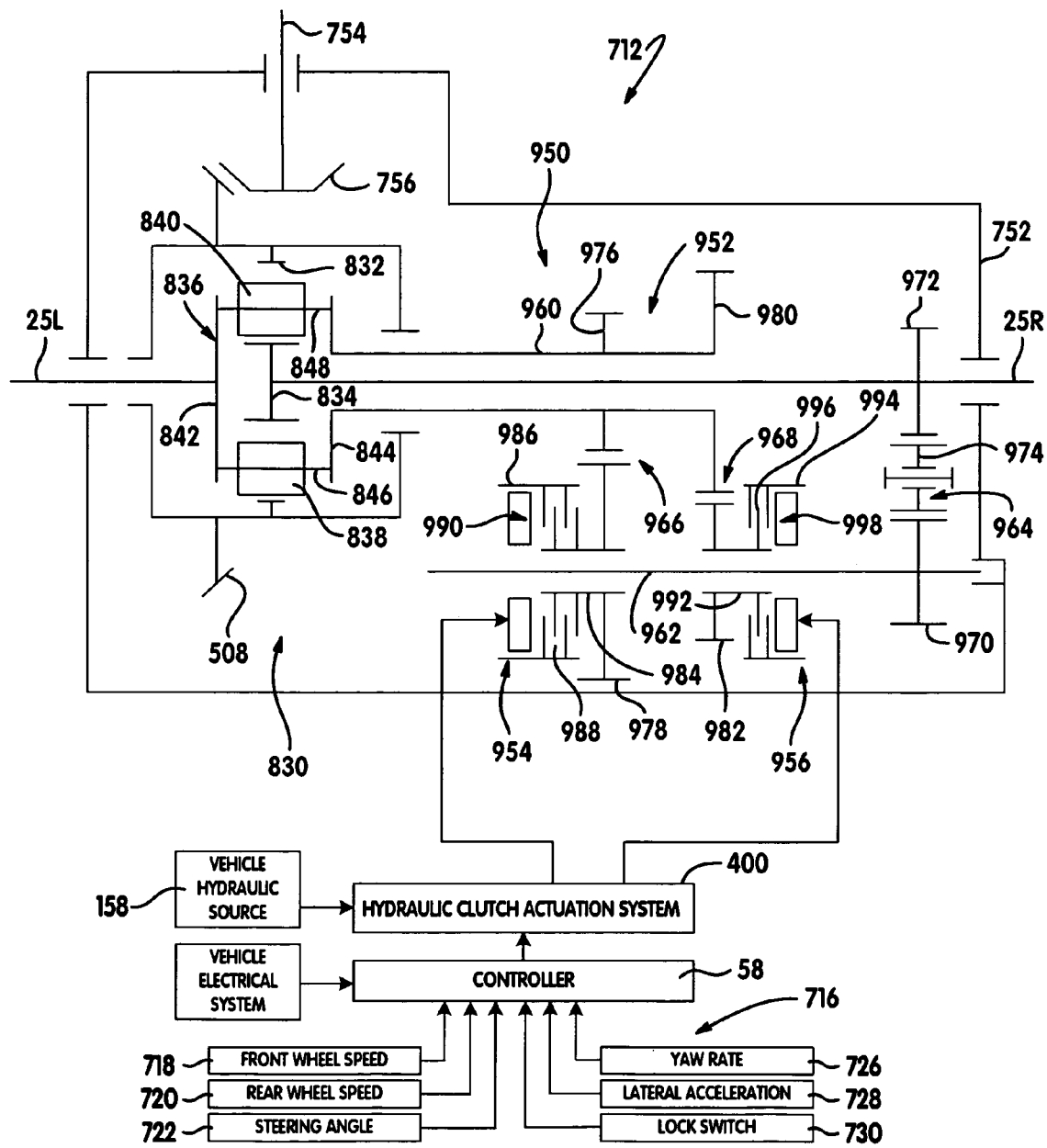

Referring now to FIG. 24, rear axle assembly 712 includes an axle housing 752 within which drive mechanism 950 is rotatably supported. In general, torque distributing drive mechanism 950 includes input shaft 754, differential 830, a speed changing unit 952, a first torque transfer mechanism 954 and a second torque transfer mechanism 956. Speed changing unit 952 includes a first transfer shaft 960 driven by differential carrier 836 for common rotation with left axleshaft 25L, a second transfer shaft 962 operably connected for rotation with right axleshaft 25R via a transfer unit 964, a first constant-mesh gearset 966 and a second constant-mesh gearset 968. Transfer unit 964 includes a first transfer gear 970 coupled for rotation with second transfer shaft 962, a second transfer gear 972 coupled for rotation with right axleshaft 25R, and an idler gear 974 meshed with both of first transfer gear 970 and second transfer gear 972. First gearset 966 includes a first drive gear 976 that is fixed to first transfer shaft 960 and meshed with a first speed gear 978 that is rotatably supported on second transfer shaft 962. In essence, first gearset 966 is a speed reducing or "underdrive" gearset which functions to cause first speed gear 978 to be rotatably driven at a slower rotary speed than first transfer shaft 960. Likewise, second gearset 968 includes a second drive gear 980 that is fixed to first transfer shaft 960 and meshed with a second speed gear 982 that is rotatably supported on second transfer shaft 962. In contrast to first gearset 966, second gearset 968 is a speed increasing or "overdrive" gearset which functions to cause second speed gear 982 to be driven at a faster rotary speed than first transfer shaft 960.

With continued reference to FIG. 24, first torque transfer mechanism 954 is shown to be operably disposed between first speed gear 978 of first gearset 966 and second transfer shaft 962. In particular, first torque transfer mechanism 954 includes a clutch hub 984 that is connected to first speed gear 978 and a drum 986 that is fixed for rotation with second transfer shaft 962. First torque transfer mechanism 954 also includes a multi-plate clutch pack 988 that is operably disposed between drum 986 and hub 984 and a hydraulically-operated clutch actuator 990. First torque transfer mechanism 954 is operable in a first or "released" mode so as to permit unrestricted rotation of second transfer shaft 962 relative to first transfer shaft 960. In contrast, first torque transfer mechanism 954 is also operable in a second or "locked" mode to couple first speed gear 978 to second transfer shaft 962, thereby driving second transfer shaft 962 at a reduced speed relative to first transfer shaft 960. Thus, first torque transfer mechanism 954 functions in its locked mode to decrease the rotary speed of right axleshaft 25R which, in turn, causes differential 830 to generate a corresponding increase in the rotary speed of left axleshaft 25L, thereby directing more drive torque to left axleshaft 25L than is transmitted to right axleshaft 25R. First torque transfer mechanism 954 is shifted between its released and locked modes due to actuation of hydraulically-operated clutch actuator 990 via actuation of clutch actuation system 400 in response to control signals from controller 58.

Second torque transfer mechanism 956 is shown to be operably disposed between second speed gear 982 of second gearset 968 and second transfer shaft 962. In particular, second torque transfer mechanism 956 includes a clutch hub 992 that is fixed for rotation with second speed gear 982, a drum 994 fixed for rotation with second transfer shaft 962, a multi-plate clutch pack 996 operably disposed between hub 992 and drum 994, and a hydraulically-operated clutch actuator 998. Second torque transfer mechanism 956 is operable in a first or "released" mode so as to permit unrestricted relative rotation between first transfer shaft 960 and second transfer shaft 962. In contrast, second torque transfer mechanism 956 is also operable in a second or "locked" mode to couple second speed gear 982 to second transfer shaft 962, thereby increasing the rotary speed of second transfer shaft 962 relative to first transfer shaft 960. Thus, second torque transfer mechanism 956 functions in its locked mode to increase the rotary speed of right axleshaft 25R which, in turn, causes differential 830 to decrease the rotary speed of left axleshaft 25L, thereby directing more drive torque to right axleshaft 25R than is directed to left axleshaft 25L. Second torque transfer mechanism 956 is shifted between its released and locked modes via actuation of clutch actuator 998 by clutch actuation system 400 in response to control signals from controller 58.

Figure 25:
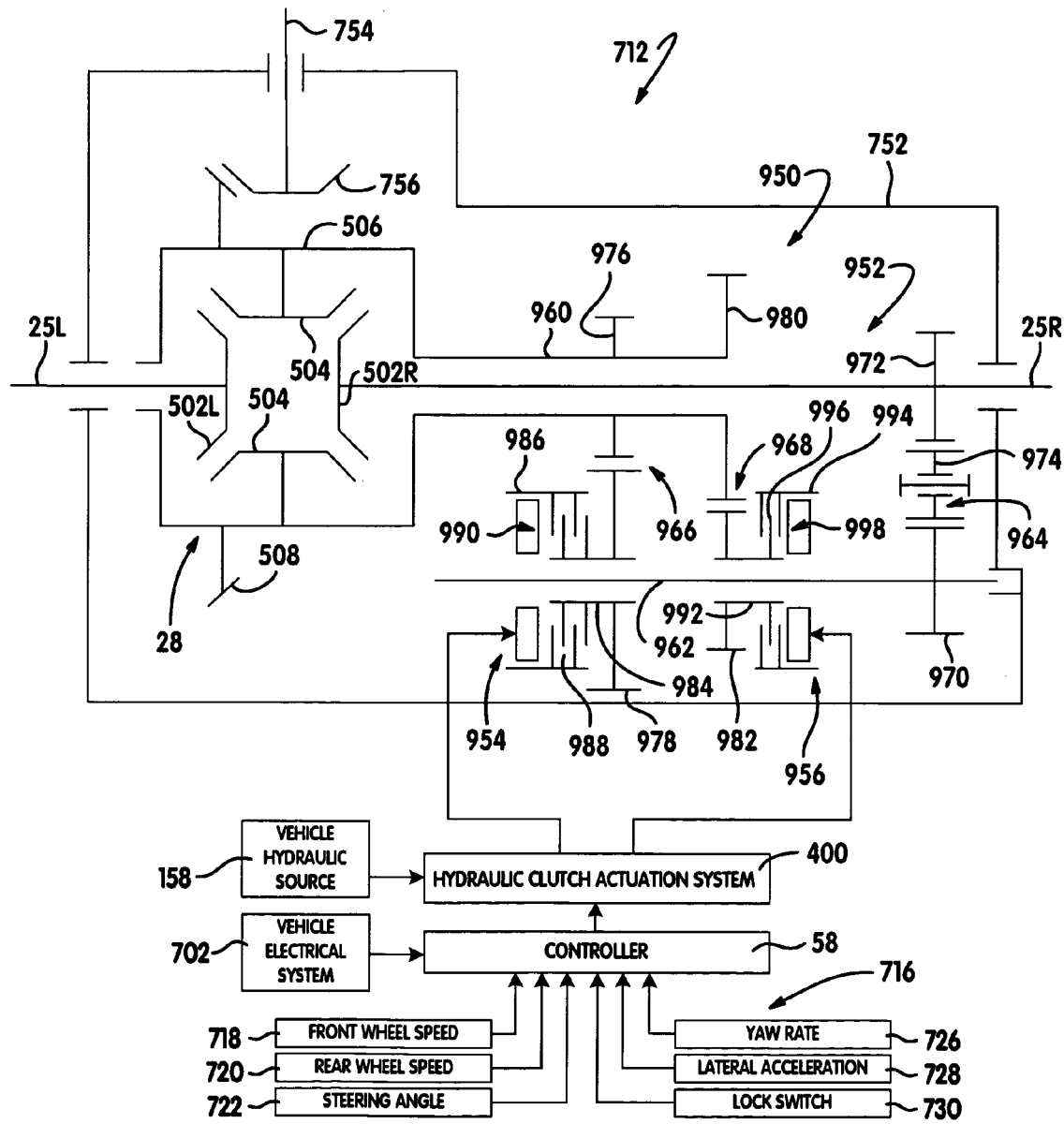

Referring now to FIG. 25, an alternative embodiment of torque distributing drive mechanism 950 of FIG. 24 is shown and designated by reference numeral 950'. Generally speaking, a large number of components are common to both drive mechanism 950 and 950', with such components being identified by the same reference numbers. However, a bevel differential 28 replaces planetary differential 830 and first transfer shaft 960 is now shown to be driven by the input component of bevel differential 28 instead of one of the output components of planetary differential 830. Bevel differential 28 includes a differential case 506 as its input component and left and right side gears 502L and 502R, respectively, as its output components.

Preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A drive axle assembly for use in a motor vehicle having a powertrain and first and second wheels, comprising:
   an input shaft driven by the powertrain;
   a first axleshaft driving the first wheel;
   a second axleshaft driving the second wheel;
   a differential having an input component driven by said input shaft, a first output component driving said first axleshaft and a second output component driving said second axleshaft;
   a first gearset having a first ring gear driven by said input component, a first sun gear, a first planet carrier driven by said first output component, and a set of first planet gears supported by said first planet carrier and meshed with said first sun gear and said first ring gear;
   a second gearset having a second ring gear driven by said input component, a second sun gear, a second planet carrier driven by said second output component, and a set of second planet gears supported by said second planet carrier and meshed with said second sun gear and said second ring gear;

a first clutch selectively engageable to brake rotation of said first sun gear;

a first clutch actuator operable to control engagement of said first clutch;

a second clutch selectively engageable to brake rotation of said second sun gear;

a second clutch actuator operable to control engagement of said second clutch; and a hydraulic clutch actuation system having a primary fluid circuit and a second fluid circuit interconnected by a pressure intensifier unit, said second fluid circuit operable to independently control actuation of said first and second clutch actuators.

2. The drive axle assembly of claim 1 wherein said first clutch is operable in a first mode to permit unrestricted rotation of said first sun gear and in a second mode to prevent rotation of said first sun gear, wherein said second clutch is operable in a first mode to permit unrestricted rotation of said second sun gear and in a second mode to prevent rotation of said second sun gear.

3. The drive axle assembly of claim 2 wherein an overdrive mode is established when said first clutch is in its second mode and said second clutch is in its first mode such that said first axleshaft is driven at an increased rotary speed relative to said input component which causes said second axleshaft to be driven at a decreased rotary speed relative to said input component.

4. The drive axle assembly of claim 2 wherein an underdrive mode is established when said first clutch is in its first mode and said second clutch is in its second mode such that said first axleshaft is driven at a reduced rotary speed relative to said input component which causes said second axleshaft to be driven at a corresponding increased rotary speed.

5. A drive axle assembly for use in a motor vehicle having a powertrain and first and second wheels, comprising:

an input shaft driven by the powertrain;
a first shaft driving the first wheel;
a second shaft driving the second wheel;
a differential having an input component driven by said input shaft, a first output component driving said first shaft and a second output component driving said second shaft;
a first planetary gearset operably interconnected between said input component and said first output component;
a second planetary gearset operably interconnected between said input component and said second output component;
a first clutch operable for selectively engaging said first planetary gearset to vary the speed ratio between said input component and said first output component;
a second clutch operable for selectively engaging said second planetary gearset to vary the speed ratio between said input component and said second output component; and
a hydraulic clutch actuation system having a primary fluid circuit and a secondary fluid circuit interconnected by a pressure intensifier unit, wherein said secondary fluid circuit is operable to independently control actuation of said first and second clutches.

6. The drive axle assembly of claim 5 wherein a first drive mode is established when said first clutch is engaged and said second clutch is released, whereby said first shaft is overdriven relative to said input component and said differential causes said second shaft to be underdriven relative to said input component, and wherein a second drive mode is established when said first clutch is released and said second clutch is engaged, whereby said second shaft is overdriven relative to said input component and said differential causes said first shaft to be underdriven relative to said input component.

7. The drive axle assembly of claim 5 further comprising a first clutch actuator for controlling actuation of said first clutch and a second clutch actuator for controlling actuation of said second clutch, and wherein said primary fluid circuit supplies a low pressure fluid to an inlet of said pressure intensifier unit and said secondary fluid circuit supplies a high pressure fluid from an outlet of said pressure intensifier unit to each of said first and second clutch actuators.

8. The drive axle assembly of claim 7 wherein said secondary fluid circuit further includes a first control valve operably disposed between said outlet of said pressure intensifier unit and said first clutch actuator and a second control valve operably disposed between said outlet of said pressure intensifier unit and said second clutch actuator.

9. The drive axle assembly of claim 7 wherein a first fluid is used in said primary fluid circuit and a second fluid is used in said secondary fluid circuit.

10. The drive axle assembly of claim 7 wherein said primary fluid circuit includes a fluid pressure source and a first valve in fluid communication with said fluid pressure source and said inlet of said pressure intensifier unit, wherein said secondary fluid circuit includes a second valve for providing fluid communication between said outlet of said pressure intensifier unit and at least one of said first and second clutch actuators.

11. The drive axle assembly of claim 10 wherein said secondary fluid circuit includes a second fluid pressure source and a third valve for varying the fluid pressure supplied by said second fluid pressure source to said second valve.

12. The drive axle assembly of claim 5 wherein said first planetary gearset includes a sun gear driven by said first output component, a carrier driven by said input component, a ring gear, and planet gears rotatably supported by said carrier and meshed with said sun gear and said ring gear, and wherein said first clutch is operable for selectively braking rotation of said ring gear.

13. The drive axle assembly of claim 5 wherein said first planetary gearset includes a ring gear driven by said input component, a carrier driving said first output component, a sun gear, and planet gears rotatably supported by said carrier and meshed with said ring gear and said sun gear, and wherein said first clutch is operable for selectively braking rotation of said sun gear.

14. A drive axle assembly for use in a motor vehicle having a powertrain and first and second wheels, comprising:

an input shaft driven by the powertrain;
a first shaft driving the first wheel;
a second shaft driving the second wheel;
a differential having an input component driven by said input shaft, a first output component driving said first shaft, and a second output component driving said second shaft;
a first clutch operably arranged to vary the speed ratio between said input component and said first output component;
a second clutch operably arranged to vary the speed ratio between said input component and said second output component; and
a hydraulic clutch actuation system for controlling independent actuation of said first and second clutches, said hydraulic clutch actuation system including a primary fluid circuit providing a low pressure fluid to an inlet of a pressure intensifier, and a secondary fluid circuit providing a high pressure fluid from an outlet of said pressure intensifier to each of said first and second clutches.

15. The drive axle assembly of claim 14 wherein a first drive mode is established when said first clutch is engaged and said second clutch is released, whereby said first shaft is overdriven relative to said input component and said differential causes said second shaft to be underdriven relative to said input component, and wherein a second drive mode is established when said first clutch is released and said second clutch is engaged, whereby said second shaft is overdriven relative to said input component and said differential causes said first shaft to be underdriven relative to said input component.

16. The drive axle assembly of claim 14 wherein said hydraulic clutch actuation system further includes a first clutch actuator for controlling actuation of said first clutch, a second clutch actuator for controlling actuation of said second clutch, a first control valve for regulating the flow of high pressure fluid from said pressure intensifier to said first clutch actuator, and a second control valve for regulating the flow of high pressure fluid from said pressure intensifier to said second clutch actuator.

17. The drive axle assembly of claim 14 further comprising:
a first planetary gearset operably interconnected between said input component and said first output component; and
a second planetary gearset operably interconnected between said input component and said second output component.

18. The drive axle assembly of claim 17 wherein said first planetary gearset includes a sun gear driven by said first output component, a carrier driven by said input component, a ring gear, and planet gears rotatably supported by said carrier and meshed with said sun gear and said ring gear, and wherein said first clutch is operable for selectively braking rotation of said ring gear.

19. The drive axle assembly of claim 17 wherein said first planetary gearset includes a ring gear driven by said input component, a carrier driving said first output component, a sun gear, and planet gears rotatably supported by said carrier and meshed with said ring gear and said sun gear, and wherein said first clutch is operable for selectively braking rotation of said sun gear.

* * * * *